(12) United States Patent
Foley

(10) Patent No.: US 6,791,993 B2
(45) Date of Patent: Sep. 14, 2004

(54) VIRTUAL GATEWAY SYSTEM AND METHOD

(75) Inventor: Peter F. Foley, Los Altos Hills, CA (US)

(73) Assignee: Broadcom Corporation, Irvine, CA (US)

(*) Notice: Subject to any disclaimer, the term of this patent is extended or adjusted under 35 U.S.C. 154(b) by 134 days.

(21) Appl. No.: 10/117,379

(22) Filed: Apr. 5, 2002

(65) Prior Publication Data

US 2002/0110118 A1 Aug. 15, 2002

Related U.S. Application Data

(63) Continuation of application No. 08/948,687, filed on Oct. 10, 1997, which is a continuation-in-part of application No. 08/924,449, filed on Aug. 28, 1997, now Pat. No. 6,069,899.

(51) Int. Cl.[7] .......................... H04Q 11/02; H04L 12/56
(52) U.S. Cl. .................... 370/430; 370/352; 375/222; 379/88.17
(58) Field of Search ..................... 370/351, 295, 370/466, 467, 389, 468, 248, 353, 392, 352, 354–356, 400, 401, 430; 375/220–222; 455/92; 379/88.13, 93.08, 88.17

(56) References Cited

U.S. PATENT DOCUMENTS

| | | | |
|---|---|---|---|
| 4,707,827 A | 11/1987 | Bione et al. | |
| 5,666,487 A | 9/1997 | Goodman et al. | |
| 5,790,173 A | 8/1998 | Strauss et al. | |
| 5,790,548 A | 8/1998 | Sistanizadeh et al. | |
| 5,793,413 A | 8/1998 | Hylton et al. | |
| 5,802,283 A | 9/1998 | Grady et al. | |
| 5,915,008 A | 6/1999 | Dulman | |
| 5,991,292 A | 11/1999 | Focsaneanu et al. | |
| 6,002,722 A | 12/1999 | Wu | |
| 6,069,899 A | 5/2000 | Foley | |
| 6,081,533 A | 6/2000 | Laubach et al. | |
| 6,101,216 A * | 8/2000 | Henderson et al. | 375/222 |
| 6,229,818 B1 * | 5/2001 | Bell | 370/466 |
| 6,414,952 B2 | 7/2002 | Foley | |
| 6,580,710 B1 * | 6/2003 | Bowen et al. | 370/353 |

FOREIGN PATENT DOCUMENTS

EP 0 269 423 6/1988

OTHER PUBLICATIONS

Peter S. Chow et al., *A Multi–drop In–house ADSL Distribution Network*, IEEE, © 1994, pp. 456–460.

* cited by examiner

*Primary Examiner*—John Pezzlo
(74) *Attorney, Agent, or Firm*—Christie, Parker & Hale, LLP

(57) ABSTRACT

Existing (already installed) plain old telephone service (POTS) wiring at a customer premises is used as the wiring infrastructure for a local area network and additionally continues to provide ordinary POTS services at the customer premises. The network signals associated with the local area network and the POTS signals delivering POTS services coexist on the POTS wiring at the customer premises using frequency division multiplexing. In additional to POTS service, the subscriber loop also provides access to xDSL (digital subscriber line) signals associated with a wide area network (WAN). Thus three distinct networks (the PSTN associated with POTS, xDSL and the LAN) coexist on a single wiring infrastructure. A virtual gateway provides for communication between each of the distinct networks without breaking the electrical continuity of the POTS wiring at the customer premises and thus maintaining lifeline POTS services, without the installation of a new dedicated active (needing AC current) Gateway device, and without the need to pull new cable to implement the premises LAN.

31 Claims, 18 Drawing Sheets

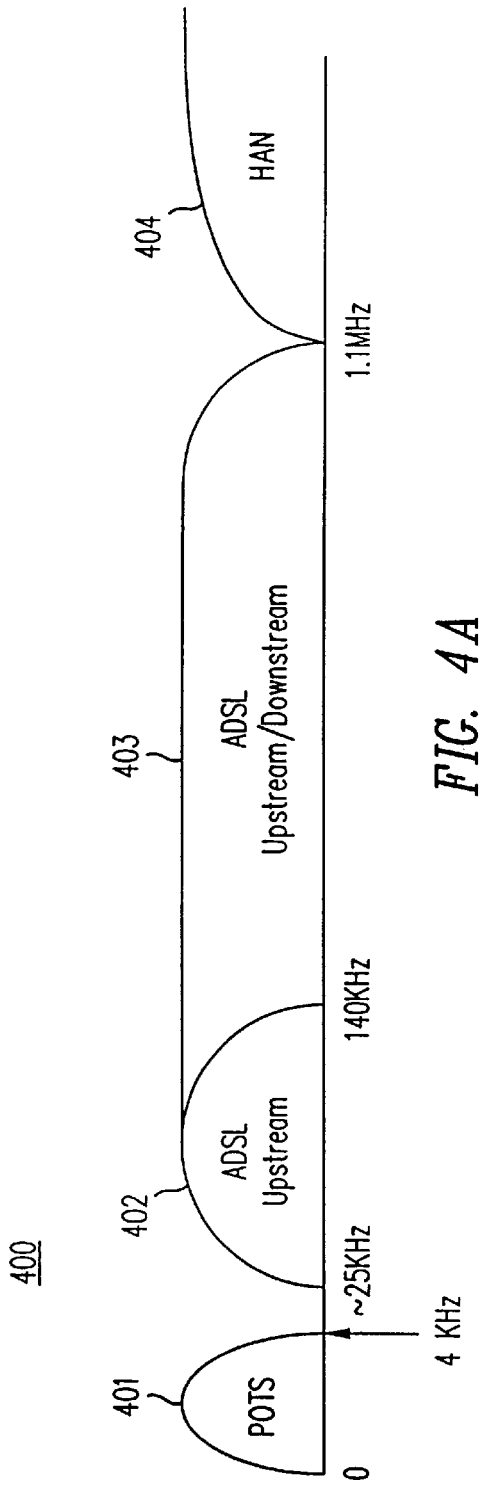
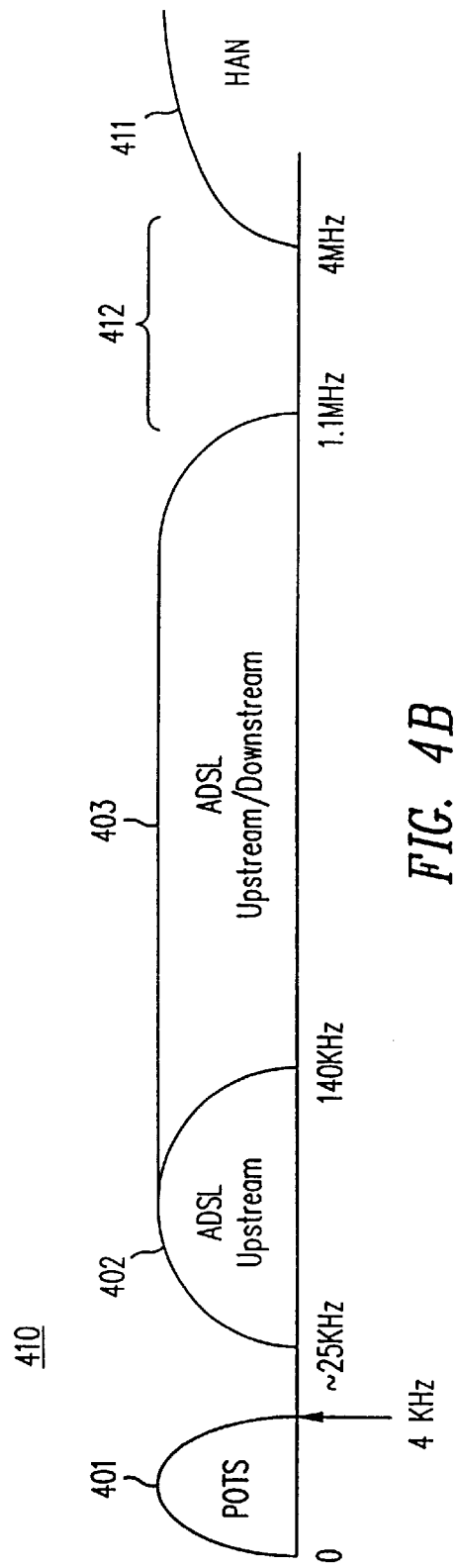
FIG. 4A
FIG. 4B

US 6,791,993 B2

VIRTUAL GATEWAY SYSTEM AND METHOD

The present application is a continuation of U.S. patent application Ser. No. 08/948,687 filed on Oct. 10, 1997 which is a continuation-in-part of U.S. patent application Ser. No. 08/924,449 filed on Aug. 28, 1997 now U.S. Pat. No. 6,069,899.

BACKGROUND OF THE INVENTION

This invention relates generally to computer network gateways and more particularly to computer network gateways that connect a local area network to one or more distinct networks sharing the same electrically contiguous communication channel.

The expansion of the Internet and the world wide web, the prevalence of telecommuting, and the anticipation of video on demand has generated a demand for the delivery of digital information to customer premises at bandwidths higher than can be delivered using traditional voice-grade modem technology.

Various solutions to the high bandwidth delivery problem are under development. Unfortunately, many of these solutions require the installation of a new wiring or cabling infrastructure to deliver information to a customer premises. One class of technology that does not have this drawback is digital subscriber line (xDSL) technology. Digital subscriber line technology has the advantage that it uses the existing subscriber line (local loop) infrastructure to deliver a higher bandwidth signal to a customer premises. This means that it uses the existing unshielded twisted pair (UTP) copper wiring that connects to a customer premises (subscriber premises).

The preferred xDSL technology, Asymmetric Digital Subscriber Line (ADSL), achieves the delivery of higher bandwidth by installing ADSL modems at both ends of the subscriber loop (e.g., at the telephone central office and at the customer premises). ADSL signals are then transmitted between the ADSL modem at the central office (ATU-C), and premises ADSL modem (ATU-R) over the existing UTP subscriber loop wiring.

FIG. 1 illustrates the spectral allocation 100 on an asymmetrical digital subscriber line (ADSL). The baseband portion of the spectrum is allocated for POTS connections 101 and the portion from 25 KHz to 1.1 MHz is allocated for ADSL signals 102. ADSL signals 102 provide access to wide area computer networks and the POTS connections provide access to the public switched telephone network (PSTN).

Many customer premises provide xDSL access to more than one computer at a premises. Conventionally, this multiple access is provided using a 10baseT LAN to connect multiple computers to an xDSL modem/hub. The xDSL modem/hub performs xDSL modem functions and additionally may perform gateway (networking bridging) functions to facilitate communication between the premises LAN and the WAN made accessible via xDSL technology.

FIG. 2 illustrates a conventional xDSL system that provides multiple computers 201 with access to a wide area network (WAN) 202 via xDSL. The exemplary xDSL system uses asymmetrical digital subscriber loop (ADSL) technology. The system includes a conventional ADSL modem/hub 203 that operates as a network hub (e.g., a 10/100baseT Ethernet hub) for local area network 205. LAN 205, also known as the Premises Distribution Network is a point to point LAN having a star configuration centered around the hub portion of ADSL modem/hub 203. Installing LAN 105 involves the installation of a wiring network that supports 10/100baseT Ethernet. This means that new wiring or cabling must be "pulled" for each computer 201 to be included in LAN 205

ADSL modem/hub 203 is coupled to a telephone central office 207 via a subscriber loop. ADSL modem/hub 203 includes a POTS splitter 213 that may couple plain old telephone service signals to the exiting (installed) plain old telephone service (POTS) UTP wiring (POTS wiring) 206 at the customer premises 204.

In operation, a conventional ADSL modem 208 (ATU-C) located at central office 207 receives digital signals from a wide area network 202, modulates the received signals and then places them on the UTP subscriber loop using a POTS splitter at the central office. This POTS splitter combines ADSL signals and POTS signals for transmission to the premises and conversely splits POTS and ADSL signals upon reception from the premises.

Preferably, ADSL modem/hub 203 is located at the telephone Network Interface (TNI) 210 at the demarcation point between the subscriber loop and the customer premises so that the output of the POTS splitter 213 is coupled to the premises UTP wiring before any branching occurs and before the installation of any RJ-11 jacks. The subscriber loop is thus terminated at the ADSL modem/hub, which is an active device requiring AC power. Locating POTS splitter 213 elsewhere at a customer premises requires knowledge of the customer premises wiring topology and the willingness to electrically "break" the wiring at the splitter insertion point in order to insert the active device (e.g., the ADSL modem/hub 203). Without a clear understanding of the customer premises wiring topology, it is difficult to know which part of the premises wiring will carry both ADSL and POTS signals as opposed to only POTS signals. Most typically, the POTS splitter is integral with the ADSL modem/hub (as shown in FIG. 1) therefor, it is preferred to install the ADSL modem/hub 203 at or near the TNI 210. Placing on ADSL modem/hub 203 at the TNI 210, however, has certain drawbacks such as the need for an AC power source/outlet near the TNI and the risk of exposure to harsh environmental elements (e.g., temperature extremes, rain, etc.). Further, when the hub and the modem are combined, new wiring must be "pulled" to the TNI from computers 201 to complete network connections.

The above described system known in the art provides for communication between multiple device networks: a WAN, a LAN at a customer premises and the PSTN. This communication is enabled using an active device (e.g., an ADSL modem/hub) that breaks the electrical continuity between the subscriber loop and the premises LAN (Premises Distribution Network) with the installation of an active device, typically a hub, in order to provide hub/gateway functionality between the LAN and the WAN.

The above described system has several drawbacks. The system requires the installation of a new active device (the hub 203) that adds considerable cost and installation complexity. Further, installing new wiring for a LAN at the customer premises is complex and costly, and the LAN and the subscriber loop do not share the same electrically contiguous communications medium. The LAN wiring does not support DC current flow from the subscriber loop, which means POTS, and more particularly, POTS lifeline service, is not supported on the LAN wiring.

Thus, there is a need for an improved system and method for interconnecting distinct premises LAN and subscriber loop WAN device networks without the need for insertion of an active hub/gateway device between the premises POTS wiring and the subscriber loop, without the pulling of new cable to implement the premises LAN, and without breaking the electrical continuity (DC current capability) of the wiring—which would preclude POTS lifeline service.

SUMMARY OF THE INVENTION

In accordance with the present invention, there is provided a system and method for providing bi-directional communication between a first device network and a second device network using a shared electrically contiguous communication channel such as an existing (already installed) customer premises plain old) telephone (POTS) wiring. Each device network is coupled to the shared electrically contiguous communication channel and each are further allocated separate spectral bands for use on the shared communication channel. Thus, two distinct device networks coexist on a single shared communication channel using frequency division multiplexing. Communication between the distinct device networks is perfected by converting signals from the spectral band associated with the source network to the spectral band(s) associated with the destination network.

The gateway server of the present invention is advantageously operatively coupled to the shared communication channel without breaking the electrical continuity of the shared communication channel. Because electrical continuity is not broken, DC current may pass; and the customer premises wiring is capable of maintaining POTS lifeline services and POTS signaling protocols.

In a centralized architecture, the virtual gateway of the present invention includes first and second modems, each associated with one of the device networks. It should be understood that as used herein, "modem" means a modulator-demodulator device or a transceiver and the like. Further, as used herein "modem" includes modems that effect direct current (DC) baseband signaling as well as bandpass and highpass signaling and the like. The modem associated with the first device network has a receive portion and a transmit portion for converting signals from the spectral band associated with the first network to baseband and for converting baseband signals to the spectral band associated with the first network, respectively. Similarly, tho modem associated with the second device network has a receive portion and a transmit portion for converting signals from the spectral band associated with the second network to baseband and for converting baseband signals to the spectral band associated with the second network, respectively. The virtual gateway server additionally provides for communication of baseband data between the first and second modems using means conventionally found within a personal computer or similar computing device (such as a PCI bus, etc.). It should be understood that as used herein "baseband" includes data not modulated by a carrier frequency, such as data processed by a microprocessor of transferred over a personal computer bus such as a PCI bus.

Information is sent from a sending network to a receiving network by first demodulating the information in accordance with the protocol and modulation scheme associated with the sending network to generate baseband data. The baseband data is then processed to generate a band pass signal in accordance with the modulation scheme and protocol associated with the receiving network. The baseband processing includes any required protocol conversion to translate the data from the protocol associated with the sending network to the protocol associated with the receiving network.

In accordance with another aspect of the invention, rather than locating the first and second modems centrally on a gateway server, the gateway functionality is distributed across a plurality of network clients. Thus, first and second modems, each associated with the first and second networks, respectively, are located at a plurality of network clients. Advantageously, this distribution of the gateway functionality reduces network traffic and improves overall system performance because the same data need not be transmitted on multiple spectral bands in order to be received by clients of either device network.

In accordance with another aspect of the invention, the virtual gateway functionality is partially distributed such that the modems located at the clients provide both transmit and receive capability in the spectral band associated with the first network but provide only receive capability in the spectral band associated with the second network. The transmit capability associated with the second network is not distributed but instead is centrally located at a server. This partially distributed architecture is particularly advantageous when the second network is characterized by asymmetrical data traffic patterns. For example, in cases where the second network is a wide area network supplying video on demand, the data traffic is highly asymmetrical. Advantageously, this partial distribution of the gateway functionality reduces network traffic and improves overall system performance because data transmitted on the second network need not be retransmitted in the spectral band of the first network to be received by clients of the first network.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to tho claims being necessary to determine such inventive subject matter.

BRIEF DESCRIPTION OF THE DRAWINGS

FIG. 4A is an illustration of spectrum utilization on the POTS wiring shown in FIG. 3.

FIG. 4B is an illustration of alternative spectrum utilization on the POTS wiring shown in FIG. 3.

DETAILED DESCRIPTION OF THE INVENTION

FIGS. 3–19 depict a preferred embodiment of the present invention for purposes of illustration only. One skilled in the art will readily recognize from the following discussion that alternative embodiments of the structures and methods illustrated herein may be employed without departing from the principles of the invention described herein.

The virtual gateway of the present invention provides an interconnection between two or more device networks that are each coupled to a shared communication channel. In a preferred embodiment, the virtual gateway interconnects a home local area network (a HAN) to a POTS-accessed WAN and to an ADSL-accessed WAN. Further, in the preferred embodiment, the HAN wiring infrastructure leverages the existing (installed) customer premises wiring which is a shared communication channel common among the HAN, POTS service and ADSL service at a customer premises. To further understand the virtual gateway of the present invention, a HAN is first described.

Figure 1:
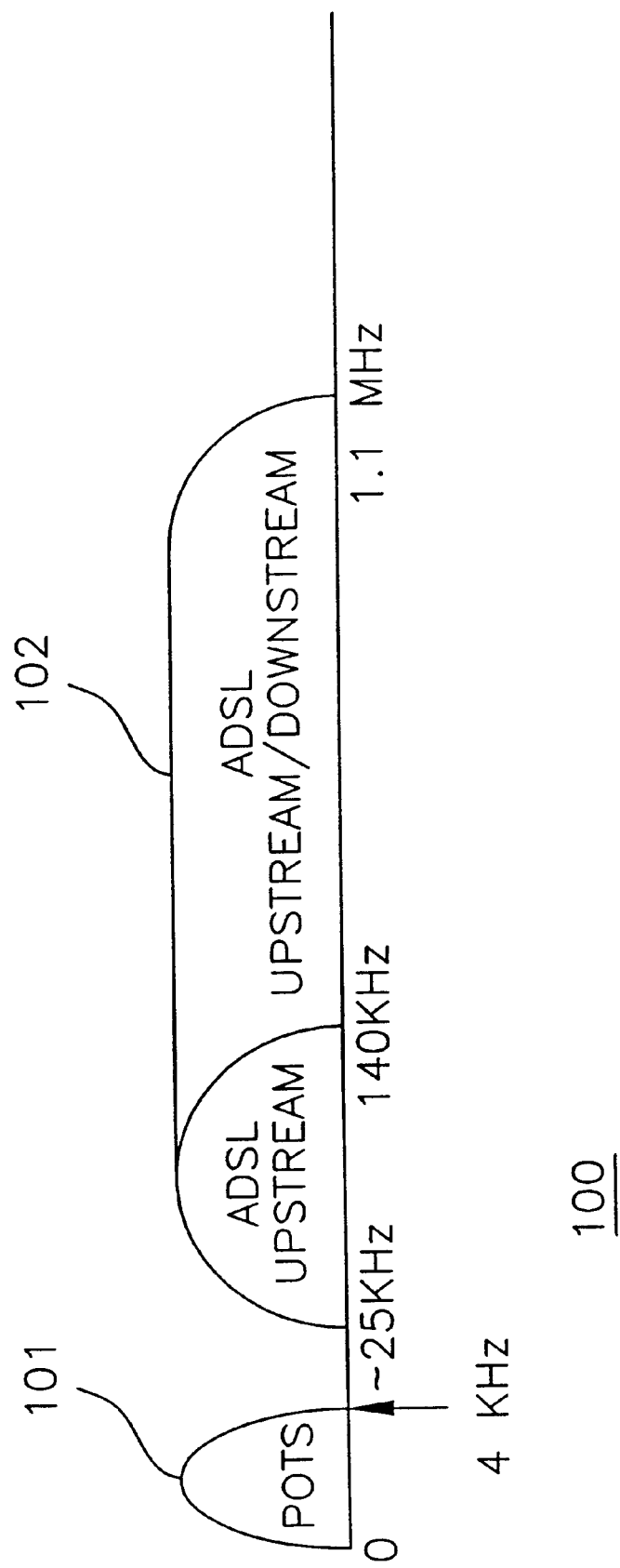
FIG. 1 illustrates spectral allocation on a digital subscriber line.
Figure 2:
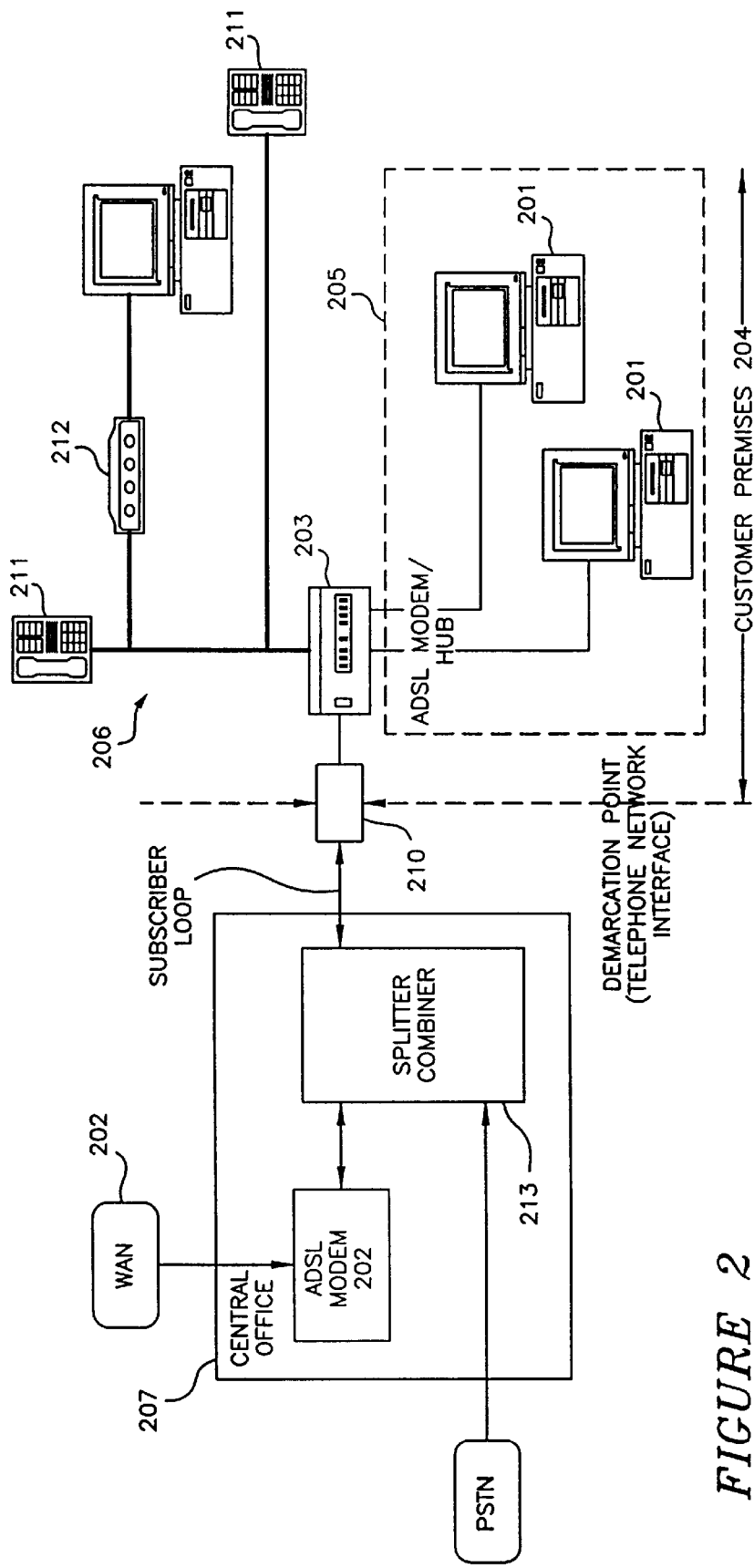
FIG. 2 illustrates a conventional local area network installed at a customer premises.
Figure 3:
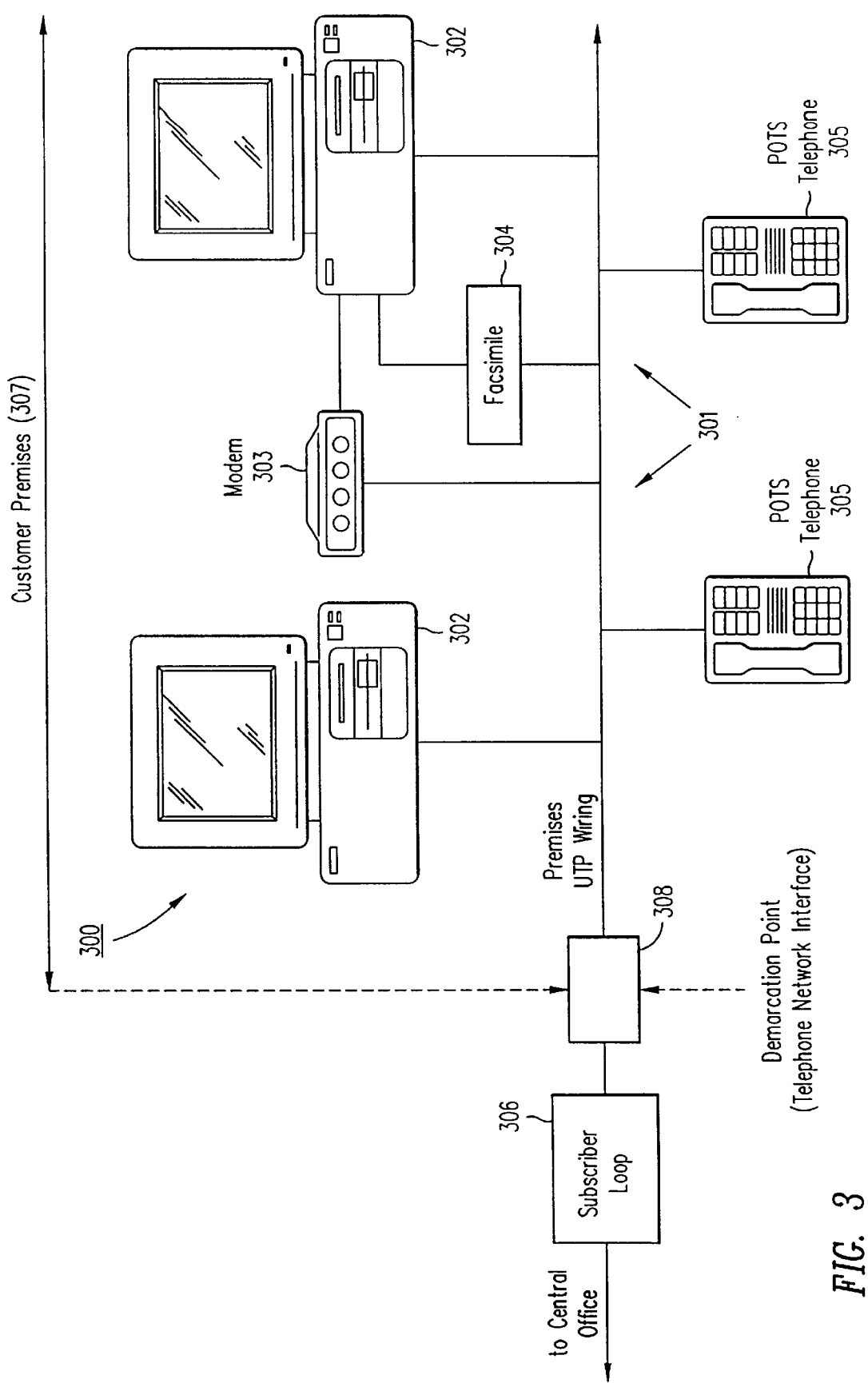
FIG. 3 illustrates a home area network (HAN) using installed POTS wiring.

FIG. 3 illustrates a home area network (HAN) 300 in accordance with the present invention. HAN 300 includes existing (installed) plain old telephone service (POTS) wiring 301, network clients 302, the computer port side of modem 303 and fax 304. POTS wiring 301 provides wiring infrastructure used to network multiple network clients 302 at a customer premises 307.

POTS wiring 301 is conventional unshielded twisted pair (UTP) wiring that is generally routed internally in the walls of the customer premises 307 (e.g., a house) to various locations (e.g., rooms) within customer premises 307.

Subscriber loop 306 (also called a "local loop") is a physical wiring link that directly connects an individual customer premises 307 to the central office Subscriber loop 306 is unshielded twisted pair (UTP) wire. UTP wire causes signal attenuation over extended distances. This attenuation is greater for higher frequency signals. To accommodate the constraints imposed by the electrical properties of subscriber loop 306, subscriber loop 306 line lengths are generally confined to a length no greater than 18 kilometers, although longer line lengths are sometimes used. Nonetheless, subscriber loop 306 is not well suited to transmit signals greater than 1.1 MHz.

Customer premises 307 is a subscriber premises that has arranged (generally for a monthly telephone service fee or for a per calling minute fee) with a local provider (such as a local telephone company) for a connection to a central office. A central office is a central telephone office (also called a local exchange) that provides local switching and non-local switching (via the Public Switched Telephone Network (PSTN)).

Figure 5A:
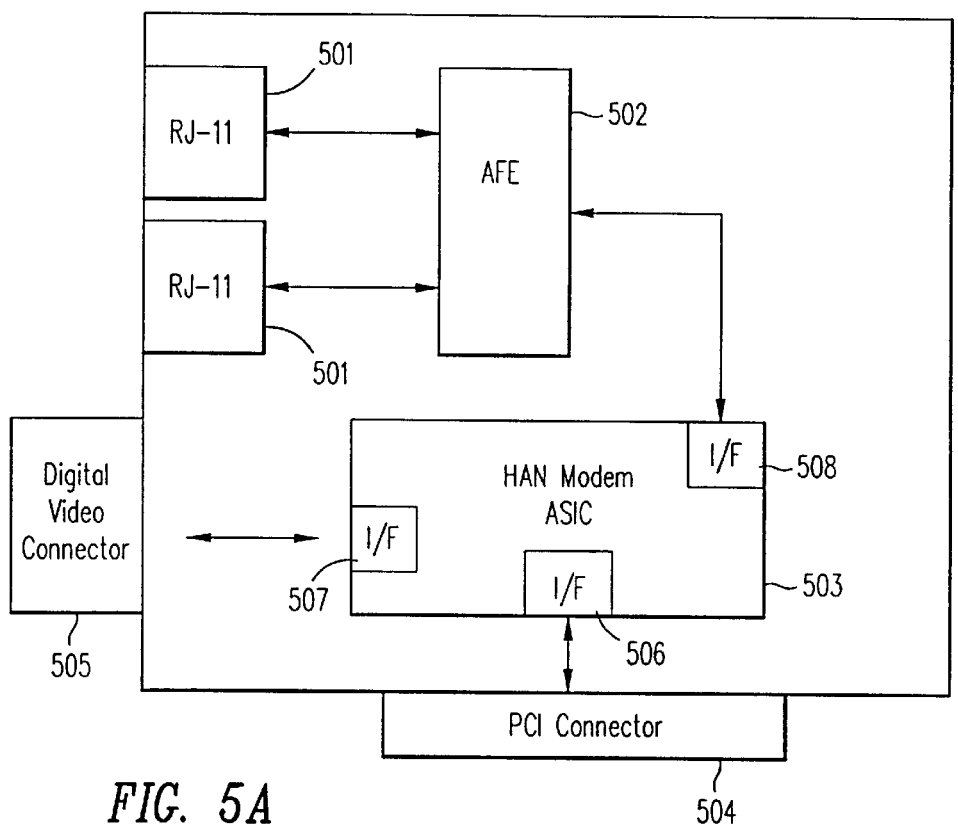
FIG. 5A is a functional block diagram of a network interface card (NIC) included in a computer installed in the HAN shown in FIG. 3.

Network client 302 is personal computer equipped with a network interface card (shown in FIG. 5A). It should be understood, however, that the principles of the present invention apply to HANs including other types of network clients such as specific purpose computers, computer appliances, computer-enabled devices or other types of network devices.

In addition to providing connectivity among (e.g., networking) network clients 302, POTS wiring 301 connects to conventional POTS-compatible POTS on telecommunications devices (such as telephones 305, modem 303 and facsimile machine 304). POTS wiring 301 thus additionally couples telephone 305 and modem 303 to a central office via subscriber loop 306. The central office, in turn, connects the POTS-compatible devices to another POTS-compatible device located off premises.

Advantageously, HAN 300 connects (networks) network clients 302 without disrupting ordinary telephone and telecommunications services including digital subscriber line (xDSL)) services conventionally provided on POTS wiring 301. HAN 301 and conventional POTS services simultaneously utilize POTS wiring 301 by frequency division multiplexing network related signals (HAN signals) and POTS signals to achieve spectral avoidance.

FIG. 4A is an illustration of the utilization of spectrum 400 on POTS wiring 301 at a customer premises in accordance with the present invention. Spectrum 400 shows four separate frequency bands in which information is communicated: a POTS band 401, an ADSL upstream band 402, an ADSL downstream band 403 and HAN band 404. POTS band 401 is baseband up to approximately 4 KHz. Conventional POTS signals such as voice signals, modem signals and facsimile signals occupy the baseband region of the spectrum with a maximum bandwidth of 4 KHz. ADSL upstream band 402 and ADSL downstream band 403 both carry signals in accordance with asymmetrical digital subscriber line (ADSL) protocol. ADSL upstream band 402 occupies a band ranging from 25KI-Iz to 1.1 MHz and carries ADSL signals from a customer premises to a central office. ADSL downstream band 403 occupies a band ranging from 140 KHz up to 1.1 MHz and carries ADSL signal from a central office to a customer premises. Instead of employing FDM to separate the upstream and downstream bands, the ADSL protocol allows upstream band 402 and downstream band 403 to overlap and share spectrum from 23 KHz to 140 KHz using echo cancellation. ADSL supports full-duplex communication. In accordance with ADSL protocol, the bandwidth allocated to downstream signals (downstream band 403) is greater than the bandwidth allocated to the upstream channel (upstream band 402) band in order to better accommodate models of information flow that anticipate a greater amount of data flowing into a customer premises rather than out of a customer premises.

HAN band 404 occupies the portion of the spectrum above 1.1 MHz. Due to line lengths associated with subscriber loops and the resulting signal attenuation at frequencies above 1.1 MHz, it is not practical to use this portion (the portion above 1.1 MHz) of the spectrum for communications between a central office and a customer premises. Line distances within a customer premises, however, are sufficiently short that signals above the 1.1 MHz range are successfully transmitted and received within a customer premises. HAN 300 therefore, utilizes the portion of spectrum above 1.1 MHz thereby avoiding that portion of the spectrum utilized at the central office to send signals to a customer premises.

FIG. 4B is an illustration of an alternative utilization of spectrum 410 on POTS wiring 301 in accordance with the invention. Spectrum 410 includes POTS band 401, ADSL upstream band 402, ADSL downstream band 403 and HAN band 411. HAN band 411 occupies the portion of the spectrum above 4 MHz. Spectrum 410 thus includes spacing band 412. Spacing band 412 is a "dead band" that is not occupied by signal, other than any signal due to frequency bleeding from adjacent bands (e.g., from ADSL downstream band 403 or HAN band 411). Use of spacing band 412 eases filter implementation by: (i) eliminating the need for strict filter characteristics; (ii) reducing the impact of group delay by allowing the placement of the filter cutoff frequency further up into the dead band; and (iii) providing a frequency band to transition between the highpass and lowpass sections of the diplex filters discussed below.

HAN 300 is a symmetric network. This means that data rates in the transmit and receive directions can be the same. Further, HAH 300 provides a half duplex channel meaning that a single network client transmits at a time. Thus HAN bands 404, 411 accommodate both transmit and receive signals in a half duplex mode of operation.

Referring back again to FIG. 3, each network client 302 is equipped with an internally mounted HAN network interface card (NIC). FIG. 5A is a functional block diagram of a preferred network interface card (NIC) 500 in accordance with the present invention. NIC 500 includes RJ-11 jacks 501, analog front end (AFE) block 502, HAN modem ASIC 503, PCI connector 504 and digital video connector 505. RJ-11 jacks 501 are conventional POTS-compatible telephone jacks. Thus, NIC 500 (and hence network client 302) are coupled to HAN 300 in the same manner that conventional telephones are coupled to the central office, by simply plugging into an existing RJ-11 wall jack. AFE block 502 is an interface circuit that performs analog signal conditioning and provides electrical isolation and surge protection in compliance with the Code of Federal Regulations (C. F. R.) Part-68 for connection to the PSTN. In order to facilitate HAN connectivity to multiple POTS lines (e.g., multiple networks of POTS wiring 301) as is the case with a customer premises 306 equipped with two phone lines. AFE block 502 is equipped with two RJ-11 jacks 501. In the two-phone-line-architecture a single network is created by bridging the separate phone lines in the HAN spectral domain.

HAN modem ASIC 503 is an application specific integrated circuit (ASIC) including circuit modules for performing signal processing including signal modulation and demodulation. HAN modem ASIC 503 additionally includes an AFE interface 508, a PCI interface 506 and a video interface 507. PCI interface 506 provides the interface formatting and hand shake signals used to communicate with the CPU on network client 302 over a PCI bus. In an alternative embodiment, communication with the network client CPU is over an ISA bus. Video interface 507 couples a digital video stream, such as received from a satellite (DSS/DVB) receiver to the HAN modem ASIC 503. Advantageously, video connector 505 and video interface 507 together allow any NIC 500 to directly forward a digital video stream from a source (such as a digital cable TV receiver, or a satellite receiver) onto HAN 300 without requiring the host CPU (the network client CPU) to receive the video and without routing the video over the PCI bus. This direct interface improves system performance and makes each NIC 500 "video ready".

Figure 5B:
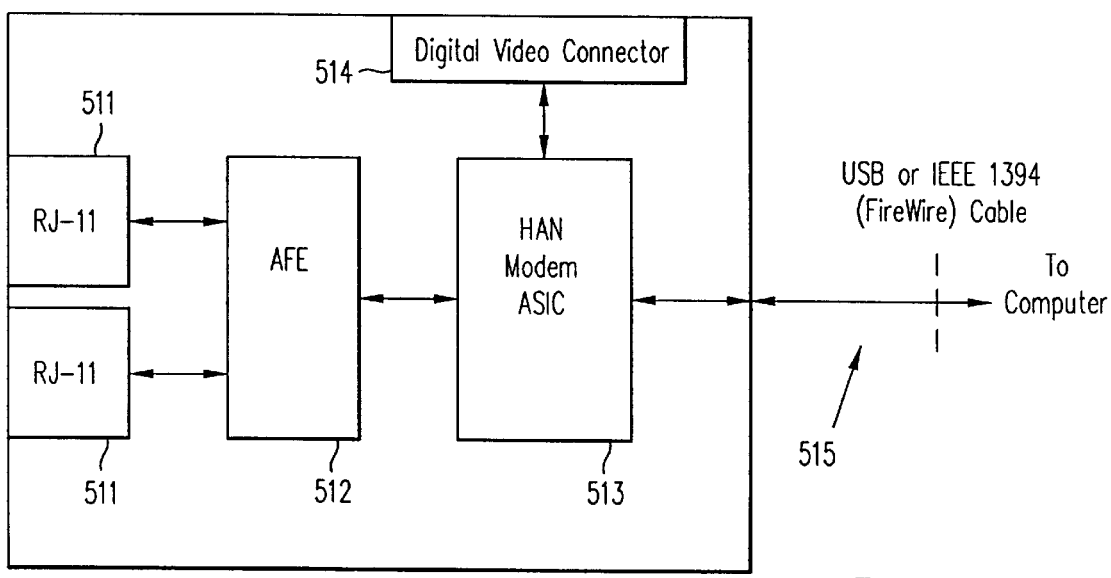
FIG. 5B is a functional block diagram of art external network peripheral interface used to connect a computer to the HAN shown in FIG. 3.

In another preferred embodiment, network client 302 is not connected to FIAN 300 via NIC 500 but instead is connected via a HAN peripheral device external to network client 302. FIG. 5B shows a HAN peripheral device 510 in accordance with the invention. HAN peripheral device 510 includes RJ-11 jacks 511, AFE block 512, HAN modem ASIC 513, digital video connector 514 and external interface bus 515. Interface bus 515 is a conventional interface bus such as USB or IEEE 1394 (FireWire). HAN modem ASIC 513 includes signal processing functionality (e.g., modulation and demodulation), an AFE interface, digital video interface and an external bus interface. HAN peripheral device 510 allows any network client 302 with a USB or IEEE 1394 (FireWire) interface to connect to HAN 300.

In alternative embodiments, HAN modem ASICs 503 and 513 additionally include POTS modem functionality (e.g., V.34 or V.56) thereby providing access to both HAN network signals and to conventional POTS signals. Further in accordance with this embodiment. AFE blocks 502 and 512 additionally include a conventional PSTN Data Access Arrangement (DAA) to provide POTS modem capability. This added POTS modem capability advantageously provides a user with connectivity to both the HAN and conventional telecommunications services on a single NIC 500 (or HAN peripheral device 510).

NIC 500 provides processing circuitry to demodulate and decode HAN signals on the receive side and to encode and modulate HAN signals on the transmit side. In a preferred embodiment, HAN signals are modulated using quadrature phase shift keying (QPSK). QPSK modulation is a relatively simple and thus a low cost modulation scheme, though not noted for spectral efficiency. Advantageously, the system is not constrained to a narrow spectral band due to the relatively short lengths of UTP installed at a customer premises. As discussed previously, as the length of UTP increases, signal attenuation becomes a limiting factor, particularly at higher signal frequencies. Therefore, bit rates are maintained by using spectrum up to 40 MHz. In an alternative embodiment, HAN signals are modulated using quadrature amplitude modulation having either 4 states (QAM-4) or 16 states (QAM-16).

Figure 6:
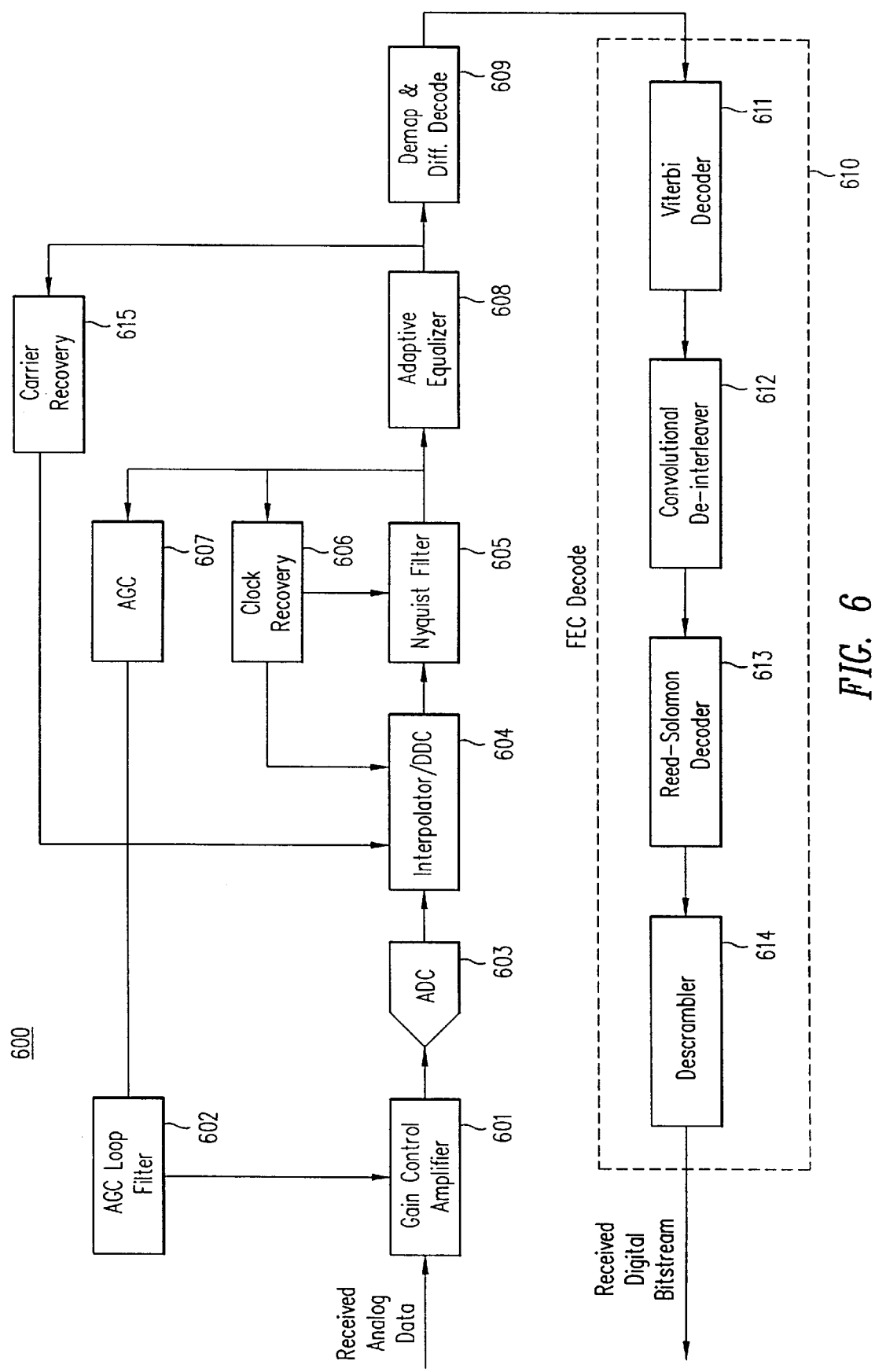
FIG. 6 is a flow diagram of the receive-side processing steps performed by the NICs shown in FIGS. 5A and 5B.

FIG. 6 is a functional block diagram of the receive-side processing 600 performed by HAN modem ASIC 503, 513. The processing blocks include gain control amplifier 601, AGC loop filter 602, ADC 603, interpolator/DDC 604, Nyquist filter 605, clock recovery 606, AGC 607, adaptive equalizer 608, demap and differential decoder 609, carder recovery module 615 and forward error correction logic 610. Forward error correction logic 610 includes viterbi decoder 611, convolutional de-interleaver 612, Reed-Solomon decoder 613 and descrambler 614. The receive side processing blocks protean, demodulate and decode a differentially encoded analog signal received from the HAN.

The received analog signal is coupled to gain control amplifier 601. The voltage of the received signal is first adjusted by gain control amplifier 601 to bring the signal into a preferred range for linear sampling by analog to digital converter (ADC) 603. The sampled received signal is then fed to an interpolator/digital down converter (DDC) 604. Interpolator/DDC 604 downconverts the passband input signal to baseband. Interpolator/DDC 604 is driven by clock recovery circuit 606 and carrier recovery module 615 to generate four samples per symbol. Clock recovery circuit 606 recovers the symbol clock. Carrier recover module 615 recovers the carrier frequency. In some implementations, in order to decrease the clock rate of the subsequent downstream processing, the incoming data is split into inphase and quadrature streams (not shown), typically with two samples per symbol. The data are then passed through matching Nyquist filler 605 for optimal signal detection. After filtering, the signal is coupled to adaptive equalizer 608 which removes the intersymbol interference caused principally by the hostile reflection/environment of customer premises wiring (POTS wiring) Equalization is carried out prior to any processing which is not linear time invariant such as the decision circuitry in demap and differential decode 609. Demap and differential decoder 609 include a demapper and a differential decoder. The demapper decodes the output symbol into a serial bit stream according to the constellation transmitted (2 hits for QPSK or QAM-4, 4 bits for QAM-16), and then the result is passed through the differential decoder. The received analog data stream is differentially encoded on the transmit side to allow simple coherent detection and prevent phase ambiguities in the recovered carrier from resulting in inaccurate data recovery.

The receive side processing blocks also include circuit blocks for clock recovery (clock recovery 606), carrier recovery module 615, and automatic gain control (AGC 607). The clock and carrier recovery circuits 606, 615 utilize phase lock techniques to maintain lock in the presence of noise. They also include sweep generators for initial signal acquisition. When, in an alternative embodiment, the gain control amplifier 601 is located externally to HAN modem ASIC 503, 513, either as a separate amplifier, or within a tuner, AGC 607 generates a PWM signal that is low pass filtered using an external LC filter (not shown).

The differentially decoded serial hit stream then enters forward error correction (FEC) logic 610. Preferably, data is encoded using a block outer code, such as Reed-Solomon followed by a convolutional inner code. Viterbi decoder 611 recovers the convolutionally encoded data Convolutional de-interleaver 612 then de-interleaves the data, Next, a Reed-Solomon decoder 613 verifies and error corrects the data using the check data added to the bitstream. Depending on the propensity of the channel to burst noise, the data may have been interleaved to effectively spread the burst errors over time where they can be effectively corrected by the convolutional and/or block coding. Although shown as part of the FEC block, the function of descrambler 614 is to recover the bit stream that was randomized in order to spread the transmit signal energy and prevent any prominent spectral lines that might arise due to periodic data patterns in the bit stream.

The result of processing in accordance with the functional blocks shown in FIG. 6 is a received digital bit stream that is coupled to the network client CPU using the appropriate interface protocol (e.g., PCI, ISA, US, IEEE 1394).

Figure 7:
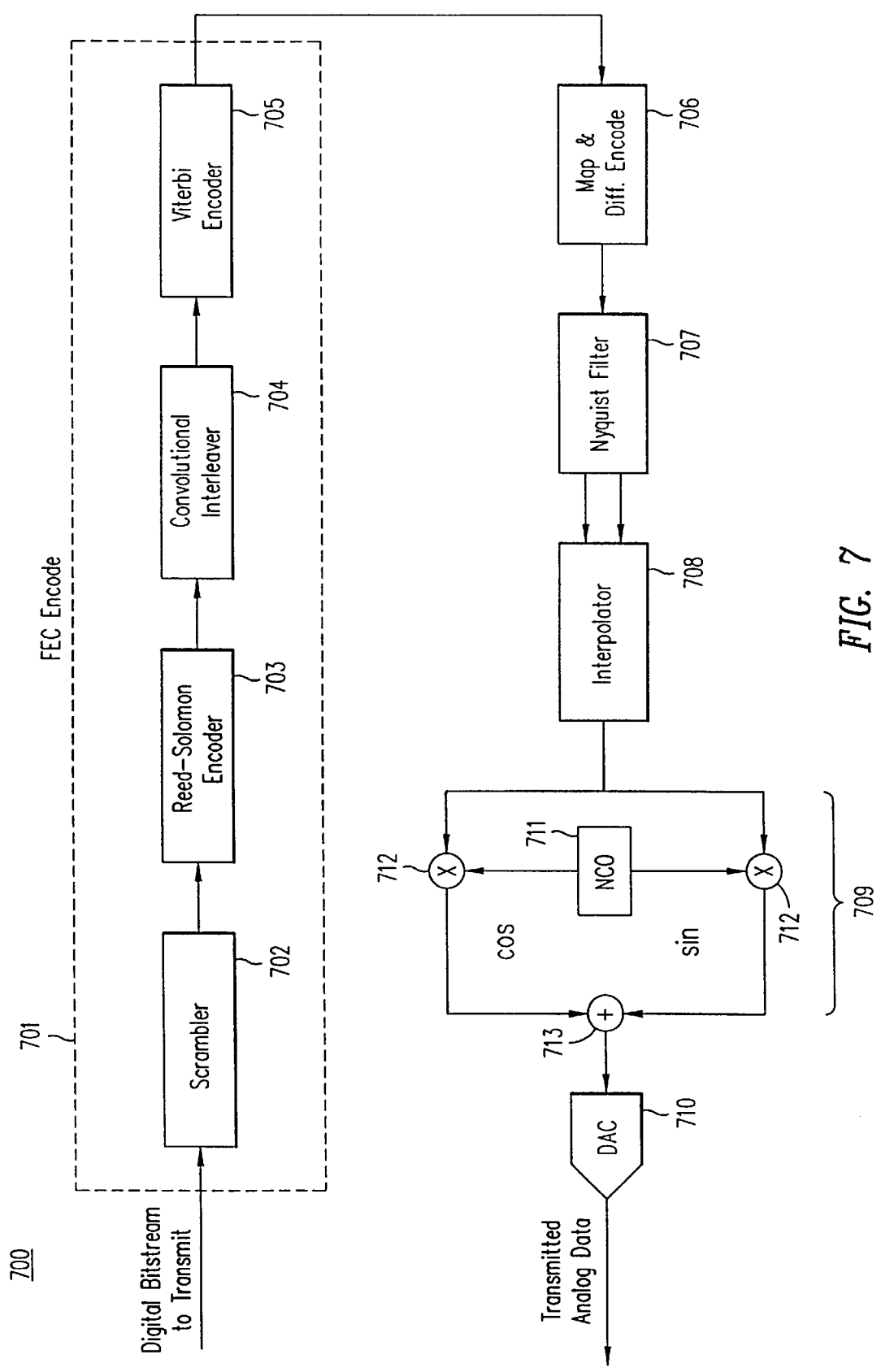
FIG. 7 is a flow diagram of the transmit-side processing steps performed by the NICs shown in FIGS. 5A and 5B.

FIG. 7 is a functional block diagram of the transmit-side processing blocks 700 of HAN modem ASIC 503, 513. The transmit-side processing blocks include forward error correction encoder 701 (including Reed-Solomon encoder 703, convolutional interleaver 704, Viterbi encoder 705), scrambler 702, mapper and differential encoder 706, Nyquist filter 707, interpolator 708, digital mixer 709, digital-to-analog converter (DAC) 710. Digital mixer 709 includes number controlled oscillator (NCO) 711, multipliers 712 and adder 713.

In operation, HAN modem ASIC 503, 513 receives a digital bit stream for transmission over HAN 300. The incoming bit stream is firm randomized by scrambler 702. Scrambler 702 uses a linear feedback shift register implementing a fifteenth order generator polynomial. This scrambling disperses the transmit energy throughout the available band and prevents the emergence of strong spectral lines corresponding to periodic data in the input stream. The randomized output is then fed into the FEC 701, which includes an outer code implemented using a Reed-Solomon block, followed by a Viterbi convolutional inner code. Depending on the propensity of the channel to burst noise, the data is also interleaved using convolutional interleaver 704 to effectively spread the burst errors over time where they can be corrected by the convolutional and/or block encoding.

Mapper and differential encoder 706 next receives the serial bit stream for processing. The serial bit stream is mapped into symbol space according to the constellation in use (2 bits for QPSK or QAM-4, 4 bits for QAM-16), and differentially encoded to facilitate coherent detection and unambiguous carrier/phase recovery at the receiver. This processing generates symbol data.

The symbol data is then Nyquist filtered using Nyquist filter 707 to bandlimit the signal to the minimum required for symbol recovery, and minimize intersymbol interference. Nyquist filter 707 is preferably realized using a transversal finite impulse response (FIR) structure.

The filtered symbol data is then interpolated by interpolator 708 before being mixed (by digital mixer 709) into the in-phase and quadrature phase components of the PSK signal. A numerically controlled oscillator 711 (preferably implemented using a table lookup) provides the sine and cosine coefficient data. The quadrature components are then summed using summer 713 (preferably resistively) prior to being fed to DAC 710.

Now referring again to FIGS. 5A, 5B, the analog transmission signal generated by HAN modem ASIC 503, 513 is next coupled to POTS wiring 301 via AFE 502, 512. The resulting analog transmission signal is a bandpass signal that occupies a region of the spectrum above the portion occupied by conventional POTS services. Thus, the analog transmission signals (the HAN network signals) are transmitted using the POTS wiring 301 at a customer premises 306 without interfering with conventional POTS signals. Advantageously, HAN network signals and conventional POTS services signals (e.g., conventional call connections and xDSL signals) simultaneously use the same wiring infrastructure at a customer premises. The installation of a separate client network infrastructure is avoided and instead existing POTS wiring is leveraged for a second, additional use.

In a preferred embodiment, network clients 302 share the HAN bandwidth in accordance with a time division multiple access (TDMA) protocol. In the preferred HAN embodiment where only one spectral band is utilized, only one receiver/transmitter pair of network clients 302 communicates at a time and each receiver/transmitter pair are allocated a time slot for communication. Network usage thus transitions from one receiver/transmitter pair to the next. In this approach, overall network performance is significantly affected by the speed at which receiver/transmitter network client 302 pairs effectively transition into network usage. To effect this transition efficiently, selected signal processing control and configuration parameters used in the receive and transmit processing 600, 700 shown in FIGS. 6 and 7 are predetermined during an initialization process and than stored locally on the HAN modem ASIC 503. The stored parameters are then used to initialize both the receive-side and transmit-side processing 600 and 700, respectively each time a receiver/transmitter pair initiates communication.

In particular, during the HAN system initialization process, training is conducted to determine and store processing parameters associated with each receiver-transmitter network client pair (e.g., each communication channel). During network operation, HAN signals (the modulated information signals) are modified in accordance with the stored processing parameters for the associated receiver/transmitter pair. Keeping local copies of processing parameters at each network client avoids retraining each time a receiver is to receive data from a new transmitter and allows rapid switching of receivers and transmitters.

In one embodiment, the stored processing parameters (modem parameters) include are a set of adaptive equalization coefficients associated with adaptive equalizer 608 and the HAN signals are modified by applying an equalization filter using the adaptive filter coefficients. In accordance with this embodiment, the initialization process includes a training session for each communication channel to generate a set of adaptive filter coefficients that match the characteristics of the channel. By determining and storing the coefficients for each channel during an initialization process, network throughput and performance is improved.

Other modem parameters which are preferably predetermined and stored include control parameters for AGC 607, for clock recovery 606, carrier recovery 615, and NCO 711 and filter coefficients for Nyquist filter 605, Nyquist filter 707, and interpolator 708.

In accordance with another embodiment of the present invention, the system and method monitors the channel characteristics associated with a plurality of communication channels to detect any change in the channel characteristics. After detecting a change, the system and method can either update the current modem parameters from the stored set of pre-trained parameters, or request that the system retrain. This embodiment of the invention is particularly advantageous during network operation when the network experiences a change in configuration such as when a telephone "ring" signal is received or when a telephone receiver is picked up or when the network is physically modified by the addition of a stub such as occurs when an additional telephone is plugged in.

In accordance with still yet another embodiment of the invention, the system and method implements an adaptive error correction scheme. The system and method determines the type of the data being communicated. For example, the system and method determines whether the data is voice data, text data, graphic, video and so forth. After determining the data type, the system and method selects and applies one of a plurality of error correction methods responsive to the determined data type. Further in accordance with this embodiment of the invention, the system and method additionally or alternatively determines the channel characteristics associated with the receiver-transmitter pair and selects one of the plurality of error correction methods responsive to the channel characteristics. Advantageously, such an adaptive error correction method provides for the selection of a preferred error correction method (e.g., one better suited for video as opposed to graphics or text etc.) based on data type as well as on the particular characteristics associated with the channel to improve channel throughput or to reduce channel latency.

Figure 8:
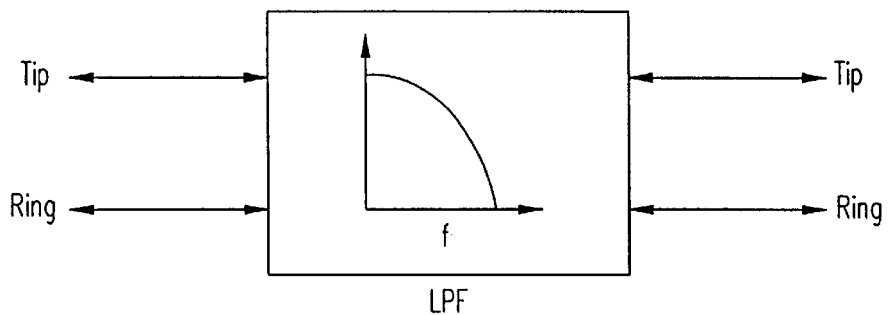
FIG. 8 shows a lowpass filter shown in the HAN illustrated in FIG. 3.

Referring back again to FIG. 3, HAN 300 performance is improved using a symmetric passive lowpass filter (filter) 308 at the telephone network interface (TNI). The telephone network interface is the demarcation point between the customer premises and the subscriber loop. Filter 308 prevents HAN signals from being placed on subscriber loop 306 and prevents noise generated on subscriber loop 306 in the HAN spectral range from intruding on HAN 300. FIG. 8 shows filter 308 coupled to TIP and RING lines on both the subscriber loop side and the customer premises side at the TNI. Filter 308 has a cutoff frequency above the frequency of the POTS services signals (e.g., above 1.1 MHz for POTS services including ADSL). Signals passing from the customer premises to the subscriber loop are lowpass filtered and similarly, signals passing from the subscriber loop to the customer premises are lowpass filtered. As stated previously, one advantage of the spectral avoidance/FDM technique of the present invention is the interoperability with legacy communications standards such as POTS, ISDN, and xDSL. Two further advantages are that the spectral allocation of the HAN can be moved even higher up the spectrum (as shown in FIG. 4B) to: (i) avoid noisy areas of the spectrum and improve the overall system signal to noise ratio; and (ii) facilitate embodiments wherein filters 308 are inexpensive passive filters having less stringent design requirements.

To understand the impact of HAN spectral allocation on the design criteria imposed on filter 308, the filter requirements stemming from a HAN allocation just above ADSL (e.g., above 1.1 MHz) is discussed. Then, for comparison, the design criteria imposed on filter 308 when HAN spectral allocation is several MHz above ADSL (e.g., 3 or 4 MHz or higher) is discussed.

In the first example, the goal is to design a passive lowpass filter to pass ADSL signals, but not signals in the HAN spectral range, and to place the bottom of the HAN spectral range close to the upper edge of the ADSL band (e.g., close to 1.1 MHz). As ADSL signals generally have significantly reduced energy by the time they reach the customer premises any additional insertion loss or modification of the ADSL signal would degrade reception. Therefore, the HAN lowpass filters (and diplexers) are designed for maximum transparency in the lowpass filter passband. The filter is preferably designed with a cutoff frequency near the top of the ADSL band with a steep relief to avoid interference in the HAN spectral band. A passive 5th order Chebychev lowpass filter with 0.2 dB of ripple in the passband and a cutoff frequency of 1.2 MHz meets this design criteria. Such a filter gives essentially flat attenuation throughout the ADSL passband of 1.1 MHz, and provides 35 dB of attenuation by 2 MHz.

Figure 12:
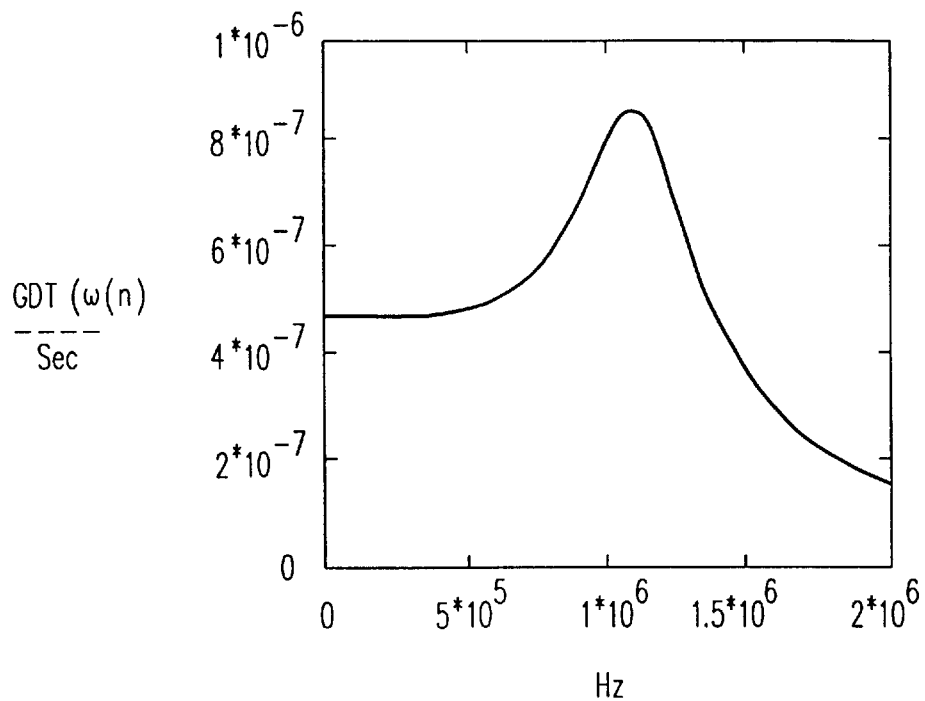
FIG. 12 is a frequency response graph illustrating the group delay associated with a filter in accordance with the invention.

FIG. 12 shows the group delay associated with this filter. As the group delay graph of this filter shows, there is a significant increase in group delay (over 500 nanoseconds) near the top of the ADSL passband. This rapid increase in group delay added by the passive filter could Impair the ability of ADSL modems to equalize the line. This type of group response, where there is a rapid increase in group delay near the cutoff frequency, is typical of passive ladder filters of the Butterworth/Chebychev type. The group delay peak increases rapidly as the filter order is increased.

Figure 13:
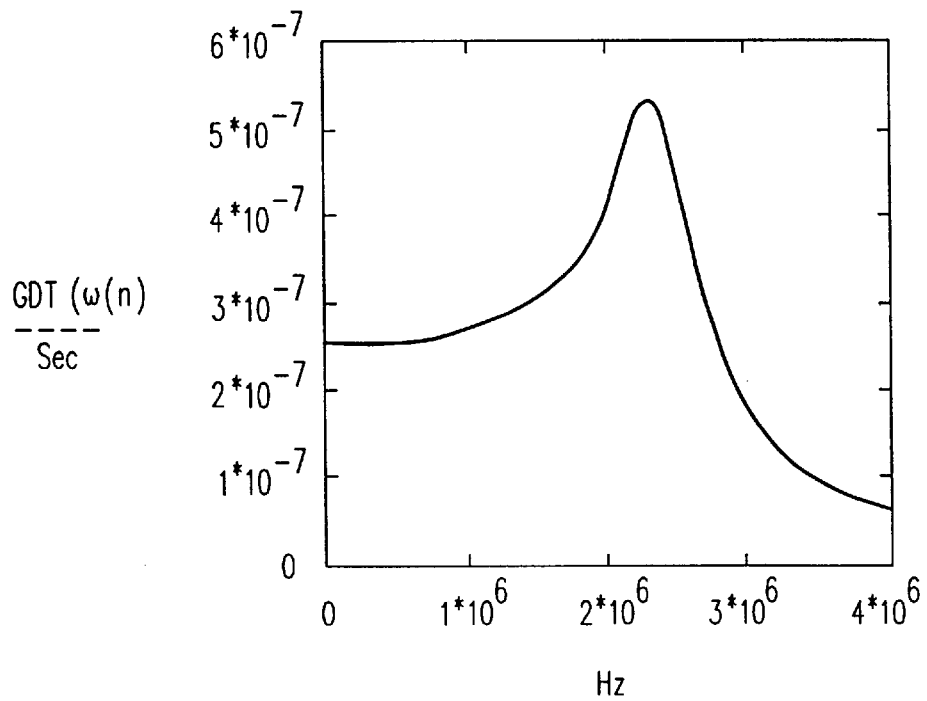
FIG. 13 is a frequency response graph illustrating the group delay associated with a filter in accordance with the invention.

However, as the lower edge of the HAN spectral range is moved up in frequency (e.g., move the HAN band up the spectrum) the design criteria for filter 308 relaxes. The cutoff frequency of the filter 308 also moves up. As a result, the area of poor group delay characteristic also moves up and into the unused frequency range between the top of the ADSL passband and the bottom of the HAN spectral range. For example, consider the selection of design criteria in a system using HAN band 411 having a lower frequency of 4 MHz. FIG. 13 graphs the group delay characteristics of a passive 5th order Chebychev lowpass filter with 0.2 dB of ripple in the passband and a cutoff frequency of 2.5 MHz. The group delay increases over 300 ns from 1.5 MHz to 2.5 MHz, and in particular there is a rapid increase in group delay from 2.1 MHz to 2.3 MHz, but this will not adversely affect either the HAN or ADSL signaling because the increase occurs in the transition band. The filter gives essentially flat attenuation and constant group delay throughout the ADSL passband, yet provides 35 dB of attenuation by 4 MHz. Note that moving the cutoff frequency up to 2.5 MHz substantially decreases the values of the inductive elements in the filter—this is beneficial because smaller inductors cost less, and have higher self resonance frequencies.

Further movement of the bottom of the HAN spectral range up in frequency would allow the use of lower order filters with shallower rolloff, thus saving cost.

Figure 9:
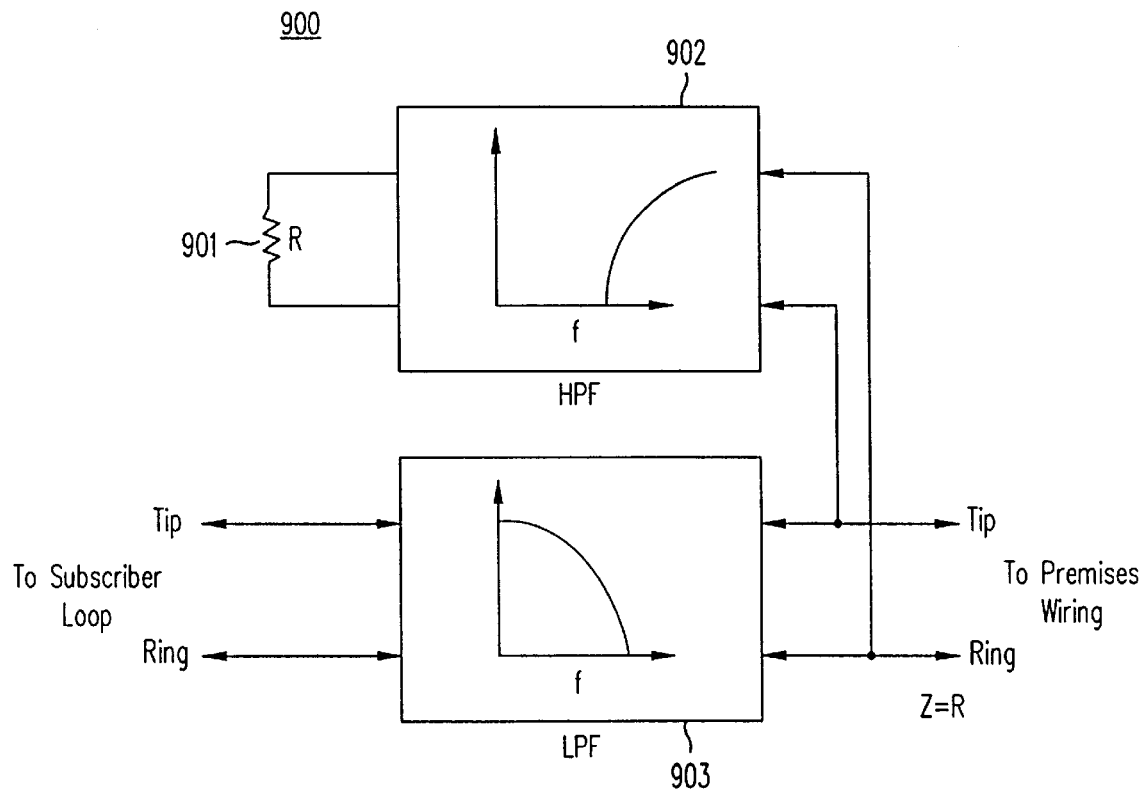
FIG. 9 shows diplexer filter which is alternatively used in place of the lowpass filter shown in the HAN illustrated in FIG. 3.

Lowpass filter 308 reflects signal energy in the filter stopband (e.g., in the HAN spectral range) back onto the POTS wiring. This reflected energy degrades signal quality, and although this can be compensated for using adaptive equalization at the receiver, it is advantageous if lowpass filter 308 is replaced at the TNI by a diplexer filter. FIG. 9 shows a passive diplexer filter 900. Use of diplexer filter 900 at the TNI advantageously provides a matched termination impedance to HAN 300 at HAN 300 operating frequencies starting in tho 3–4 MHz range. Matching termination impedance advantageously reduces signal reflections on HAN 300 thereby improving signal quality. Diplexer filter 900 includes a 100 ohm resistor 901, highpass filter 902 (having a passband starting in the 3–4 MHz range—corresponding to the HAN operating frequency range) and lowpass filter 903 (having a cutoff not below 1.2 MHz). Lowpass filter 903 is connected in-line with the POTS wiring 301 at the telephone network interface. Termination resistor 901 is coupled to HAN 300 via highpass filter 902. Thus, the impedance matching effect of termination resistor 901 is limited to frequencies in the passband of highpass filter 902. For frequencies at which HAN 300 operates, and also the frequencies that highpass filter 902 passes signals, the impedance (z) of POTS wiring 301 has an almost purely resistive impedance that is closely approximated by the 100 ohm resistor 901.

Figure 10:
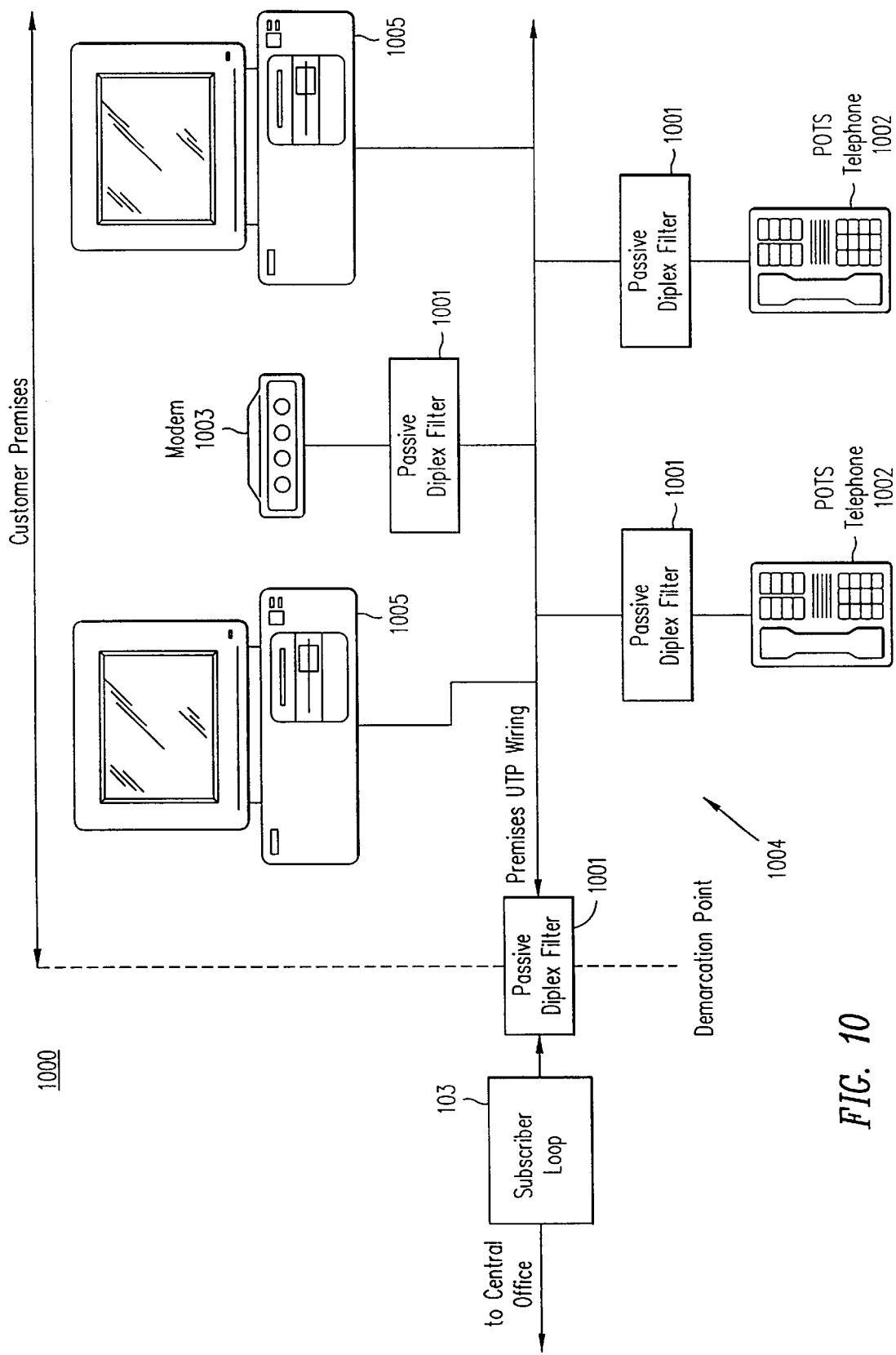
FIG. 10 shows an alternative embodiment of a HAN using filters at customer premises equipment in accordance with the present invention.

FIG. 10 shows HAN 1000, an alternative, embodiment of a HAN in accordance with the present invention. HAN 1000 includes passive diplex filters 1001 at the interface of customer premises equipment (e.g., POTS telephones 1002 and modem 1003). HAN 1000 additionally includes POTS wiring 1004 and network clients 1005. HAN 1000 couples network clients 1005 to form a computer network using existing customer premises wiring (POTS wiring 1004) by frequency division multiplexing as discussed in reference to FIG. 3. Filters 1001 improve HAN 1000 performance by (i) preventing energy in the HAN spectral range (e.g. starting at 34 MHz) from entering POTS wiring 1004; (ii) preventing energy in the HAN spectral range from being aliased down to the operating frequency range of the customer premises equipment (POTS telephones 1002 and modem 1003); and (iii) providing a matched termination to HAN 1000. Matching the termination of HAN 1000 is particularly advantageous in the case of POTS telephones which change impedance in the HAN spectral range when switching from on hook to off hook (e.g., when the handset is picked up).

Figure 11:
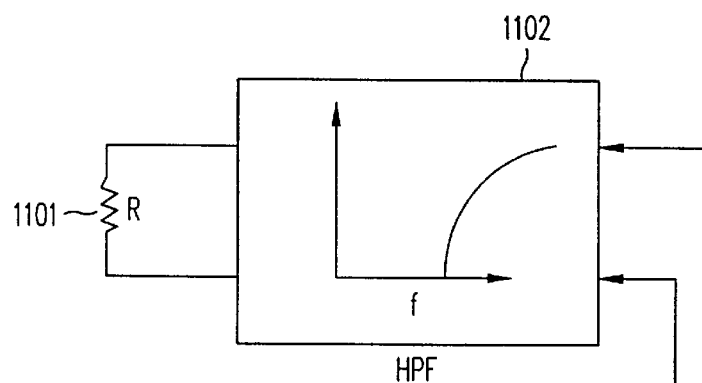
FIG. 11 is a block diagram of the diplexer filters used to connect the legacy POTS customer premises equipment to the HAN as shown in FIG. 10.
Figure 11:
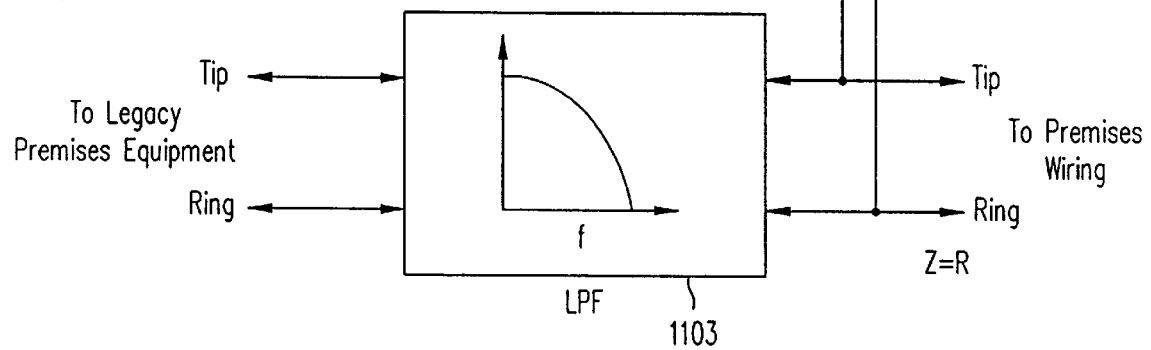

FIG. 11 is a block diagram of the diplex filters 1001 used at the interface of the POTS telephones 1002 and modem 1003 as shown in FIG. 10. Filter 1001 includes a 100 ohm resistor 1101 coupled to a highpass filter 1102 (having a pass band starting between 3 and 4 MHz) and a lowpass filter 1103 (having a cutoff not below 1.2 MHz). Resistor 1101 provides a matched termination to HAN 1100~; at its operating frequencies. Passive diplex filter 1001 also prevents energy in the HAN spectral range from entering the subscriber loop, and energy in the HAN spectral range on the subscriber loop from entering premises POTS wiring 1004.

The filters shown in and described in reference to FIGS. 3 and 8–11 are preferably passive filters that support telephone voltages and currents. These passive filters pass DC signals on the subscriber loop to the Customer premises wiring, even in the event of a power failure. Use of such passive filters in conjunction with the frequency division multiplexing (FDM) spectral avoidance technique of the present invention enable continued telephone service in the event of a local AC power failure ("lifeline services"). Ordinary telephone service continues, despite the power failure, because conventional POTS telephones operate off of a DC current supplied by the central office. Advantageously, there is thus no need for a backup battery to ensure continued availability of telephone service in the event of a power failure. In contrast, conventional PBX systems located at a customer premises cannot offer lifeline service unless they also provide battery backup. This is because they are installed between the subscriber loop and the customer premises wiring and thus "break" the electrically contiguous subscriber loop which ordinarily provides the DC current.

It should be understood that in alternative embodiments, the baseband signals occupying the POTS wiring are derived from sources other than the subscriber loop. In other embodiments, the baseband signals are derived from a wireless telecommunications link, a coaxial cable-based source or other wide area networking means. For example, alternative embodiments support delivery of broadband digital data throughout the home from varied sources such as satellite (DSS/DVB), terrestrial microwave (MMDS), digital cable/CATV ("All TV"), digital or high definition television (DTV/HDTV/ATV) and digital video disk (DVD) drive.

The above described HAN is an exemplary LAN that leverages use of existing customer premises POTS wiring. Network signals generated by the HAN coexist with POTS connection signals and with xDSL signals on an already installed wiring network (POTS wiring) at a customer premises. POTS signals are WAN signals in that they can be associated with the PSTN, with a connection local to the central office or another type of connection to a telecommunications device located remote for the customer premises. xDSL signals are associated with yet another WAN. Thus, signals from three distinct networks (the PSTN, the xDSL WAN and the HAN) coexist on a single electrically contiguous wiring infrastructure at a customers premises. It is desirable to provide communication among the three distinct networks. It is further desirable to provide such communication without breaking the continuity of the POTS wiring installed at the customer premises in order to maintain lifeline POTS services. It should be understood that if the existing POTS UTP wiring is to be used as the communications medium for all three networks, maintaining lifeline POTS services precludes breaking the line and the insertion of an active device that prevents DC current flow upon loss of AC power. Such internetwork communication and delivery of lifeline POTS service is realized using a virtual gateway in accordance with the present invention. Furthermore, the gateway functionality can be provided by an existing PC coupled to the premises POTS wiring without the addition of a new dedicated gateway hub device.

Figure 14A:
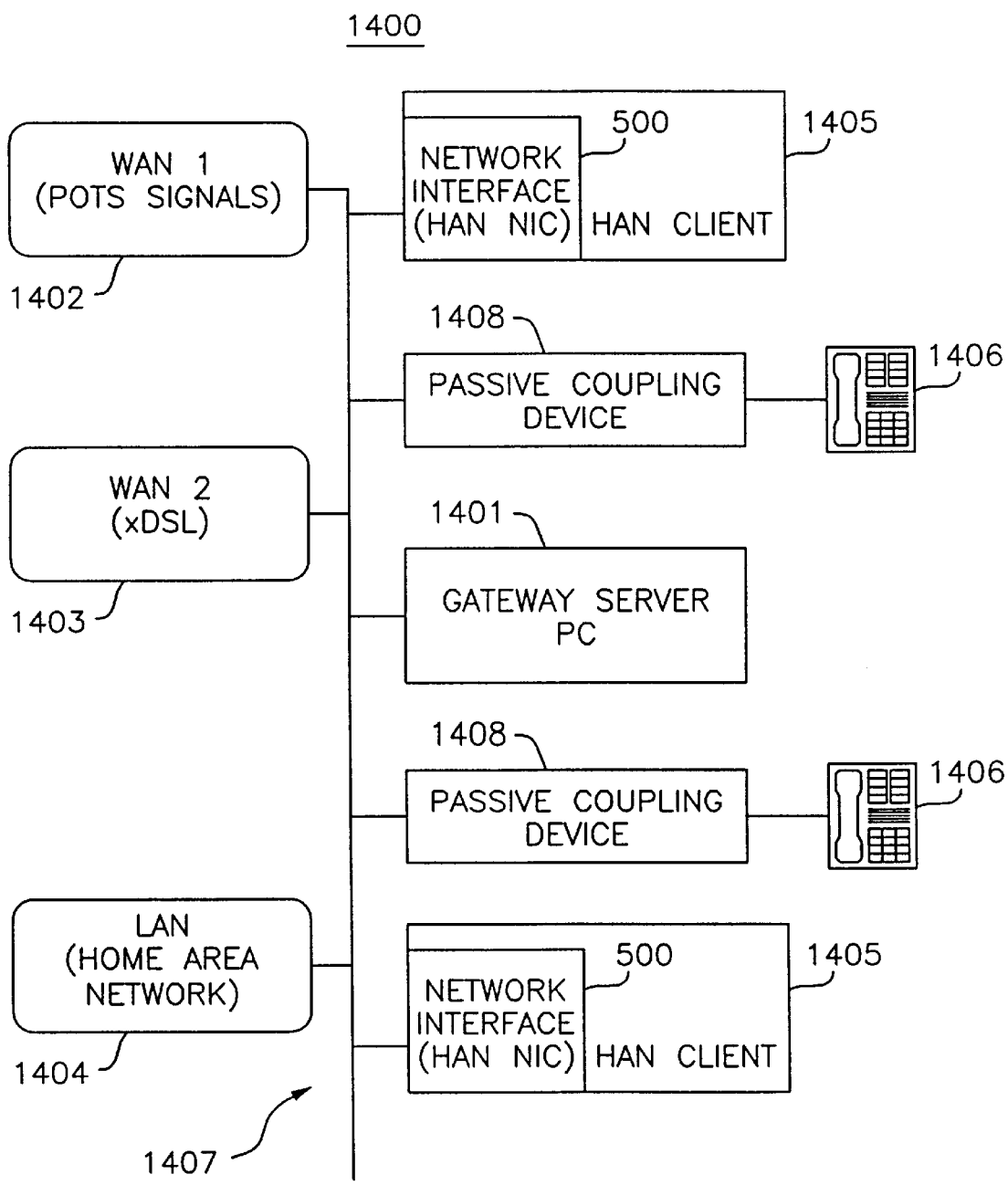
FIG. 14A is a functional block diagram of a customer premises having a centralized virtual gateway in accordance with the present invention.

FIG. 14A illustrates a customer premises system 1400 providing access to, and interconnection among, three distinct device networks: POTS-based WAN 1402, ADSL-based WAN 1403 and HAN 1404. It should be understood that, as used herein, POTS- and ADSL-"based" WANs include WANs that are accessed via POTS and ADSL services, respectively, over the subscriber loop. Thus, the physical layer signaling protocol is either POTS or ADSL. WAN 1403 and WAN 1402, however, may both use the same higher layer protocols. In fact the ADSL based WAN 1403 and the POTS based WAN 1402 may even be configured to access the same network (e.g. the Internet). Through the POTS subscriber loop, using the POTS physical layer protocol, one can access the PSTN or any number of other networks. Through the POTS subscriber loop, using the ADSL physical layer protocol one can access a number of, possibly similar, networks.

Referring still to FIG. 14A, system 1400 includes a virtual gateway (a gateway server) 1401 that facilitates the communication among the distinct networks 1402–1404. The customer premises system 1400 also includes HAN network clients 1405 interconnected via HAN 1404 using installed POTS wiring 1407. System 1400 further includes telephones 1406 coupled to POTS-based WAN 1402 via installed POTS wiring 1407 and coupling devices 1408.

Virtual gateway 1401 is a gateway server that operates as a gateway providing HAN 1404 with bi-directional communication with WANs 1402 and 1403. Virtual gateway 1401 is a personal computer having a plurality of network interface cards as described in reference to FIG. 14B above. Virtual gateway 1401 additionally includes a gateway software module that performs a virtual gateway method to effect network protocol conversion and communication among devices from the distinct networks 1402, 1403 and 1404. HAN network clients 1405 are network clients associated with (interconnected by) HAN 1404.

HAN network clients 1405 are personal computers each equipped with a network interface card 500 described in reference to FIG. 5A above. It should be understood, however, that the principles of the present invention apply to virtual gateways 1401 serving other types of network clients such as specific purpose computers, computer appliances, computer-enabled devices or other types of network devices.

POTS wiring 1407 is conventional UTP wiring that is generally routed internally in the walls of a customer premises (e.g., a house) to various locations (e.g., rooms) within the customer premises. POTS wiring 1407 is coupled to a telephone central office via a subscriber loop.

HAN 1404 is a home local area network as described in reference to FIGS. 3–11 above. HAN 1404 occupies a selected spectral band on POTS wiring 1407. It should be understood that although HAN 1404 is shown in FIG. 14A as a separate entity from POTS wiring 1407, HAN network clients 1405 and virtual gateway 1401 HAN 1404 use (and thus includes) POTS wiring 1407 to interconnect HAN network clients 1405 and virtual gateway 1401.

Coupling devices 1408 are combined HAN filter and POTS splitter devices that perform passive filtering and impedance matching discussed above. Coupling devices 1408 provides a matched termination to the HAN in the HAN spectral range and includes a low pass filter having a cutoff frequency at the low end of the ADSL band (near 25 KHz).

Virtual gateway 1401 sends and receives signals in the spectral ranges associated with each of the distinct networks 1402–1404 to effect bi-directional communication from HAN 1404 to WANS 1402 and 1403. Each HAN network client 1405 associated with HAN 1404 sends and receives signals limited to the HAN spectral domain and virtual gateway 1401 "hops" network traffic between the spectral domains of WANs 1402, 1403 and HAN 1404 to effect a bridge between the networks. Data received from a WAN (either 1402 or 1403) is first down converted to baseband, processed for network protocol conversion then upconverted to the HAN spectral range and then retransmitted on HAN 1404 so that it can be received by the appropriate HAN network client 1405. Conversely, data received from a HAN network client 1405 bound for either WAN 1402 or 1403 is transmitted over the HAN to virtual gateway 1401 for conversion down t to baseband, network protocol conversion and followed by modulation in accordance with the requirements of the destination WAN and retransmission on the (to the) destination WAN. Other implementations described below in reference to FIGS. 16 and 17 improve upon HAN bandwidth utilization. The implementation described in reference to FIG. 14A, however, reduces the complexity of the network interface card 500 installed in each HAN network client 1405.

Figure 14B:
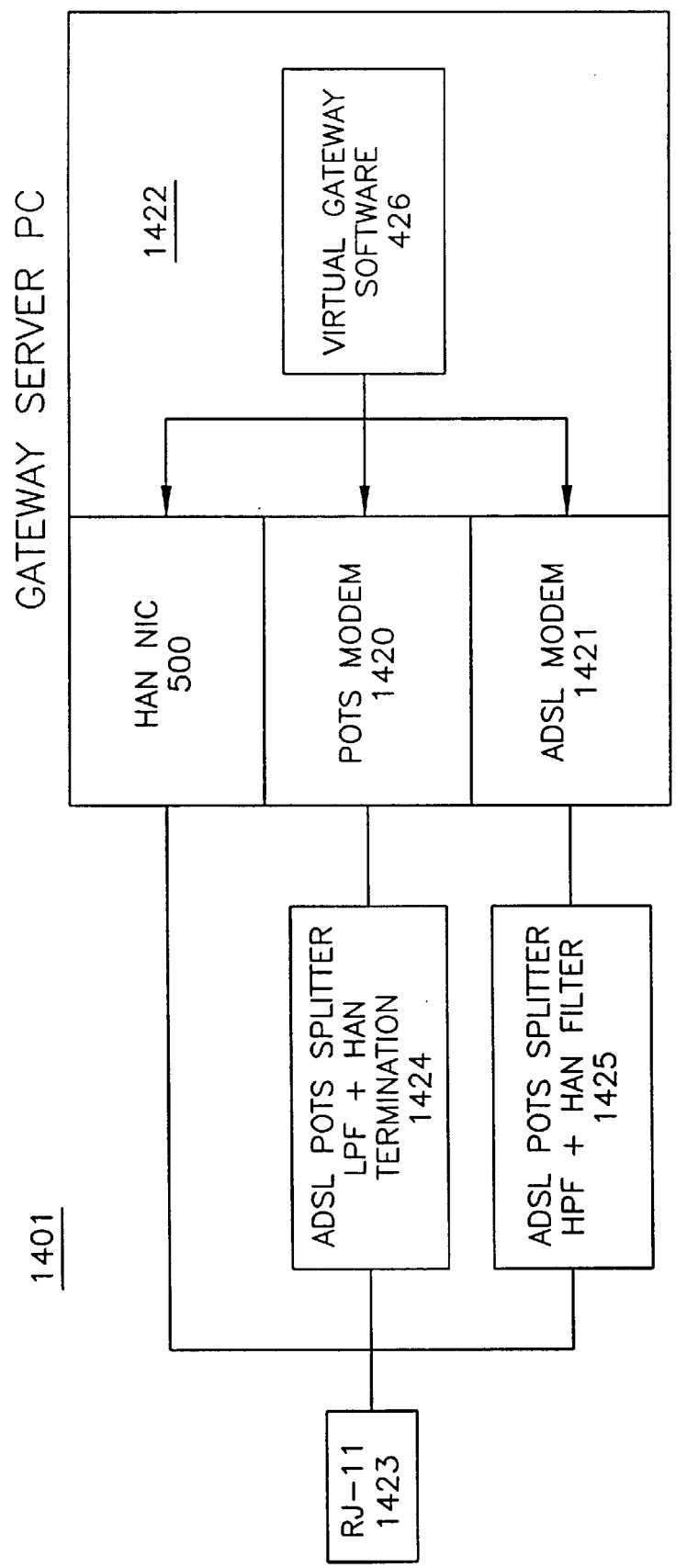
FIG. 14B is a functional block diagram of a network interface card used in the virtual gateway shown in FIG. 14A.

FIG. 14B is a functional block diagram of virtual gateway server 1401. Virtual gateway server 1401 is a personal computer 1422 running virtual gateway software 1426 and equipped with a HAN NIC 500, a POTS modem card 1420 and an ADSL modem card 1421. Virtual gateway software 1426 executes on virtual gateway 1401 and processes baseband data received from POTS modem card 1420 and ADSL modem card 1421. The baseband processing performed by virtual gateway software 1426 performs network protocol conversion to convert data from the protocol associated with the sending network to the protocol associated with the receiving network. HAN NIC 500 is the HAN NIC described above in reference to FIG. 5A. HAN NIC 500 is coupled to the customer premises wiring 1407 (shown in FIG. 14A) via an RJ-11 jack 1423.

POTS modem card 1420 is a conventional POTS modem card that provides modem (modulation-demodulation) functionality using the POTS portion of the spectrum, POTS modem card 1420 is coupled to a coupling device 1424 that includes an ADSL POTS splitter low pass filter and HAN terminating matching impedance. POTS modem card 1420 is coupled to customer premises wiring 1407 via an R J-11 jack 1423 and coupling device 1424.

ADSL modem card 1421 is a conventional ADSL modem card that provides ADSL modem (modulation-demodulation) functionality. ADSL modem card 1421 is coupled to coupling device 1425. Coupling device 1425 includes an ADSL POTS splitter high pass filter and a HAN filter that has a stop band in the frequency range corresponding to the HAN. ADSL modem card 1421 is coupled to customer premises wiring 1407 via an RJ-11 jack 1423 and coupling device 1425.

Figure 15:
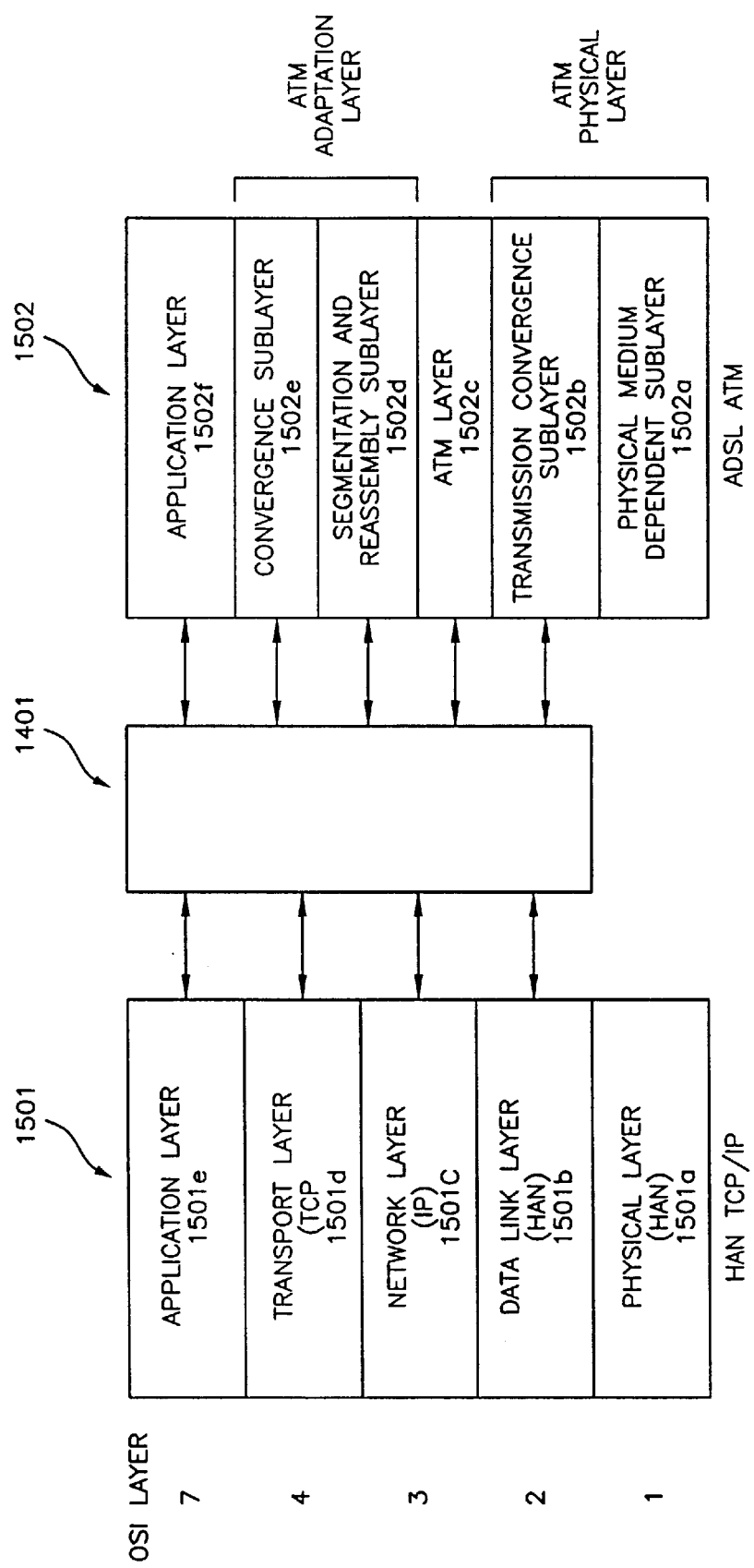
FIG. 15 is flow diagram of the virtual gateway method implemented by the centralized virtual gateway shown in FIG. 14.

FIG. 15 illustrates an example of the internetworking functionality that can be provided by virtual gateway server 1401. Specifically, virtual gateway server 1401 provides communication between an asynchronous transfer mode (ATM) WAN and the TCP/IP HAN.

In this embodiment, the ADSL-accessed WAN provides ATM services directly to the premises through the ADSL modem, and the HAN provides transmission control protocol/Internet protocol TCP/IP) services between the HAN clients on the premises distribution network. In order to successfully internetwork these dissimilar networks, the virtual gateway provides functionality on a number of different levels according to the standard reference models.

FIG. 15 shows the TCP/IP layers 1501 in the standard OSI reference model and the ATM layers 1502 using the B-ISDN ATM reference model. Rough functional equivalence between the models layers can be seen by their horizontal adjacency in the diagram. For example, the physical layer 1501a of the HAN corresponds to transmission convergence sublayer 1502b and physical medium dependent sublayer 1502a. Similarly, application layer 1501e of the HAN corresponds to application layer 1502f of the ADSL ATM network.

Gateway server 1401 provides the HAN physical and data link layer functionality primarily through the HAN NIC card 500, although some of the data link layer may be implemented by virtual gateway software 1426 on the gateway server 1407. The TCP/IP functionality found in layers three (Network) and four (Transport) of the OSI model (1501c, d) are conventionally provided as a portion of the server PC operating system. The ADSL layers shown in the diagram are provided by a conventional ADSL modem/NIC card (not shown), although some of the ATM functionality, particularly the AAL sublayers (1502d, e) and ATM layer 1502c, may be provided by software running on the gateway server PC.

The virtual gateway software 1426 running on the server PC implements protocols between the various layers 1501 and 1502 in the two reference model stacks. Virtual gateway software 1426 allows applications running on the ATM network (the ADSL-accessed network) to communicate with applications running on the TCP/IP HAN network. In order to accomplish this, virtual gateway software 1426 handles protocol issues at the various levels, including, but not limited to, address resolution, routing, segmentation and reassembly, flow control/traffic shaping, error management, acknowledgments, synchronization, QoS issues, security issues, accounting issues, and multicasting/broadcasting issues. ATM is a connection oriented/virtual circuit, cell oriented technology with strong focus on QoS, whereas TCP/IP is a connectionless datagram oriented service, therefore the protocol differences between the two networks are significant.

Virtual gateway software 1426 thus provides a baseband channel (a communication means) between the HAN NIC 500 and the ADSL modem card both installed in gateway server 1401.

It should be understood that the xDSL accessed WAN need not be an ATM network, but rather it could be a TCP/IP network or any number of different network types. The internetworking issues surrounding communicating with any dissimilar network are similar to those outlined above.

The system 1400 described in reference to FIG. 14A is a centralized gateway system. Alternative embodiments of the invention use either a partially distributed gateway or a fully distributed gateway. Fully and partially distributed virtual gateways described below in reference to FIGS. 16 and 17, respectively, improve HAN bandwidth utilization as compared to use of a central virtual gateway.

Figure 16:
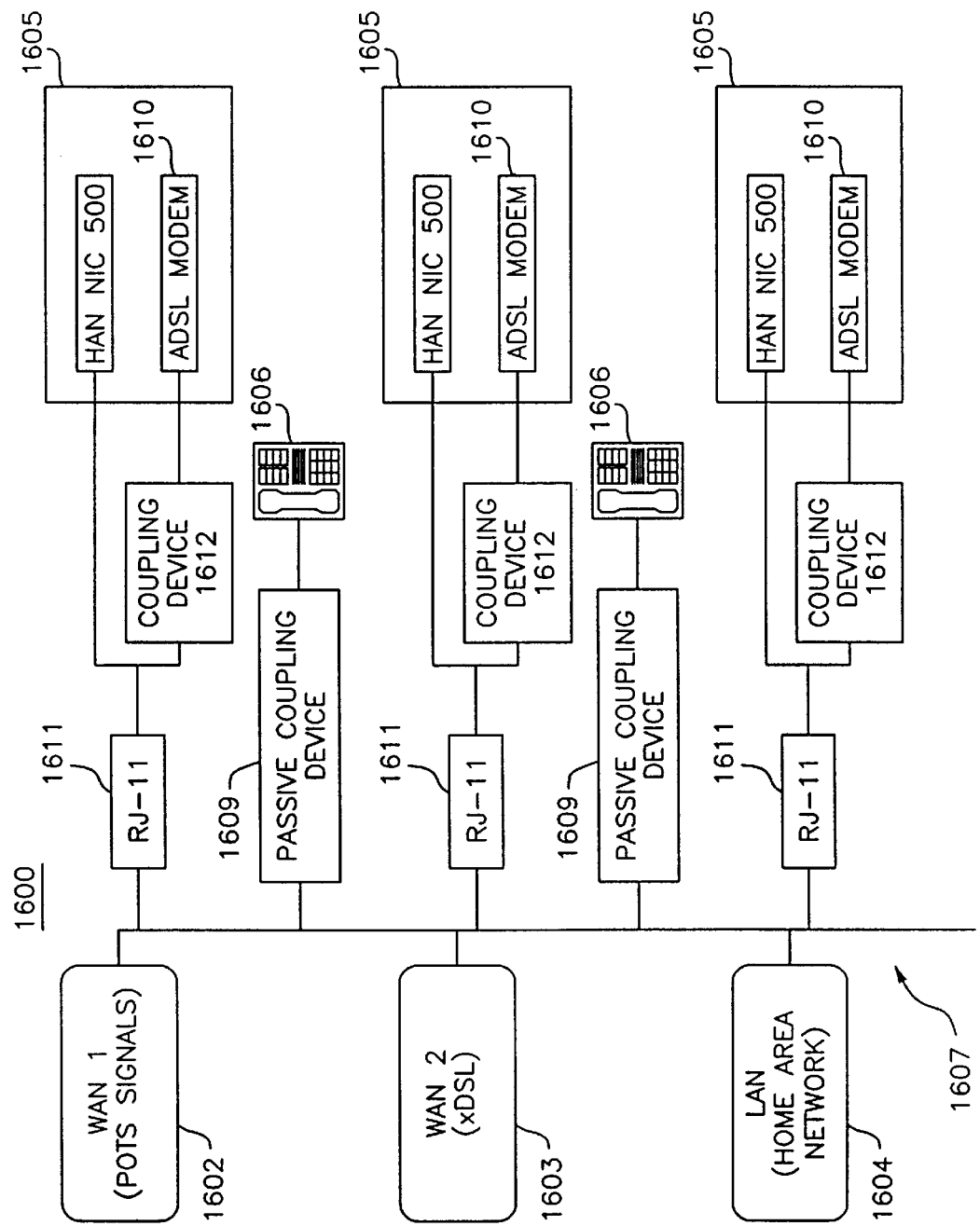
FIG. 16 is a functional block diagram of a customer premises having a fully distributed virtual gateway in accordance with the present invention.

FIG. 16 illustrates a customer premises having a fully distributed virtual gateway system 1600 that provides access to distinct networks 1602, 1603 and 1604.

WAN 1602 is a POTS-based network, WAN 1603 is an xDSL accessed WAN and HAN 1604 is a home local area network as described above in reference to FIGS. 3–11. Access to each network 1602–1604 is provided using installed POTS wiring 1607. Telephones 1606 are coupled to POTS-based WAN 1602 via coupling devices 1609 and POTS wiring 1607. HAN network clients 1605 are each coupled to HAN 1604 and to xDSL-based WAN 1603 using existing POTS wiring 1607 accessed via an RJ-11 telephone jack 1611. In this fully distributed implementation, the gateway/bridge functionality is not centralized, and instead each HAN network client 1605 both sends and receives information on either HAN 1602 or WAN 1603. This distributed implementation results in improved system flexibility and robustness but increases the complexity of each HAN network client 1605. Overall throughput on all of the networks is optimized because data does not need to be "hopped" or retransmitted on any of the networks.

HAN network clients 1605 are conventional personal computers or other network client devices equipped with a HAN NIC 500 as described above in reference to FIG. 5. HAN network client 1605 additionally includes a conventional ADSL modem card 1610. ADSL modem card 1610 performs both transmit and receive functions to transmit and receive signals in accordance with ADSL format and protocol. Both the HAN NIC 500 and ADSL modem 1610 are coupled to POTS wiring 1607 via RJ-11 jack 1611. The ADSL modem 1610, however, is coupled to RJ-11 jack 1611 via ADSL coupling device 1612. ADSL coupling device 1612 has an ADSL POTS splitter portion that is a high pass filter as well as a HAN filter (providing filtering in the HAN spectral range).

Figure 17:
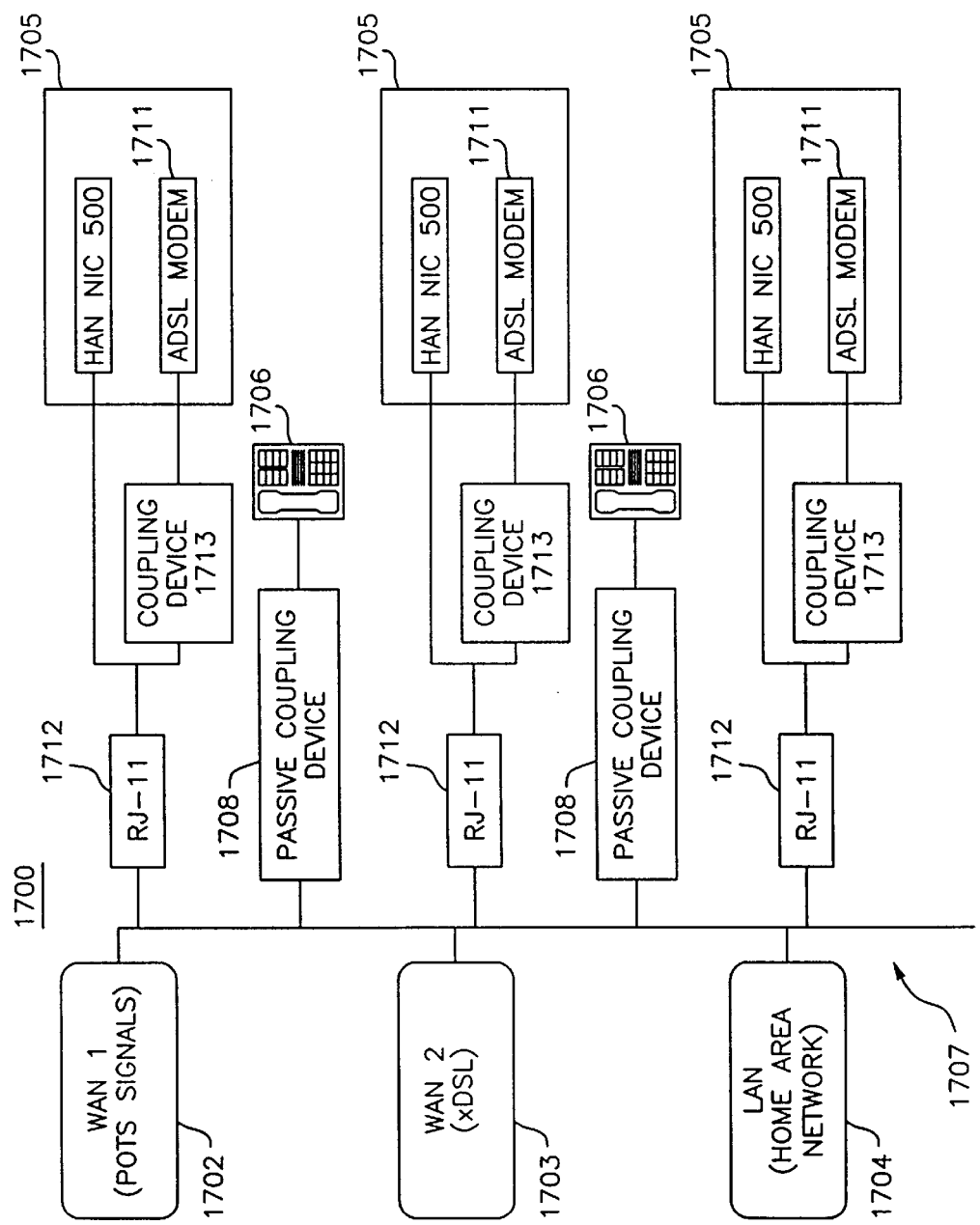
FIG. 17 is a functional block diagram of a customer premises having a partially distributed virtual gateway in accordance with the present invention.

FIG. 17 illustrates a customer premises system 1700 having a partially distributed virtual gateway. System 1700 provides access to distinct networks 1702, 1703, and 1704. Network access is provided using installed POTS wiring 1707, a gateway server 1701 and a unidirectioned gateway at each HAN client 1705. In this implementation, HAN clients 1705 receive WAN (1702, 1703) data directly but send data to the destination WAN by going through gateway server 1701. System 1700 thus provides distributed "receive", side access to ADS accessed WAN 1703. This partially distributed implementation is preferred for broadcast type WAN data such as video on-demand (VOD). System 1700 provides conventional telephones 1706 with access to POTS-based WAN 1702 via passive coupling device 1708.

HAN clients 1705 are conventional personal computers or other network client devices equipped with a HAN NIC 500 as described above in reference to FIG. 5. HAN network client 1705 is additionally equipped with an ADSL modem card 1711. ADSL modem card 1711 is a "receive only" modem card that provides ADSL receiving functionality. ADSL modem card 1711 is coupled to POTS wiring 1707 via RJ-11 jack 1712 and coupling device 1713. Gateway server 1701 is coupled to POTS wiring 1707 via RJ-11 jack 1712. Gateway server 1701 is a personal computer equipped with an ADSL modem card 1714 as well as a HAN NIC 500. ADSL modem card 1714 is a "transmit only" ADSL modem card that provides ADSL transmit capability.

Figure 18:
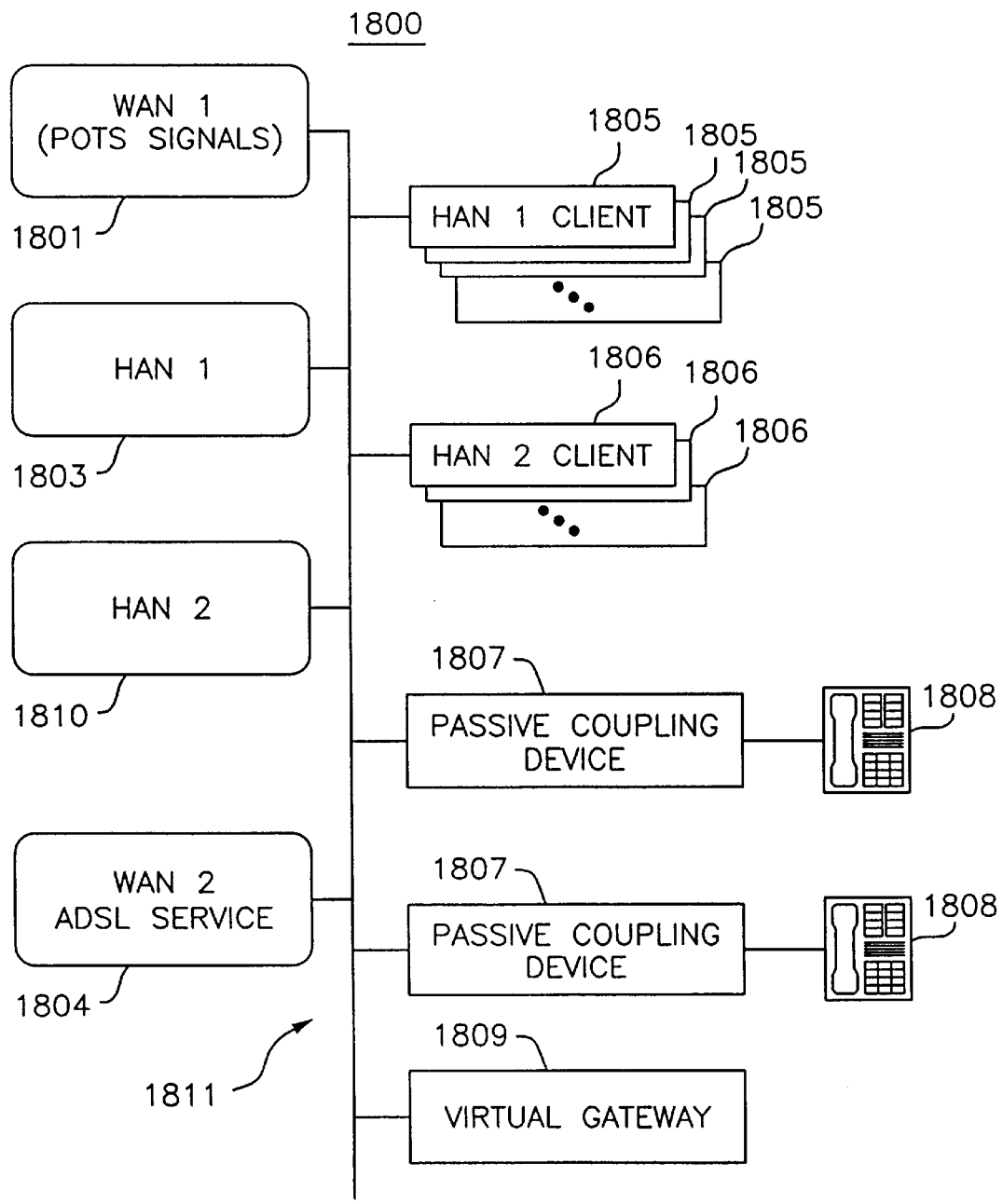
FIG. 18 is a functional block diagram of a customer premises having two separate HANs operating on customer premises POTS wiring.
Figure 19:
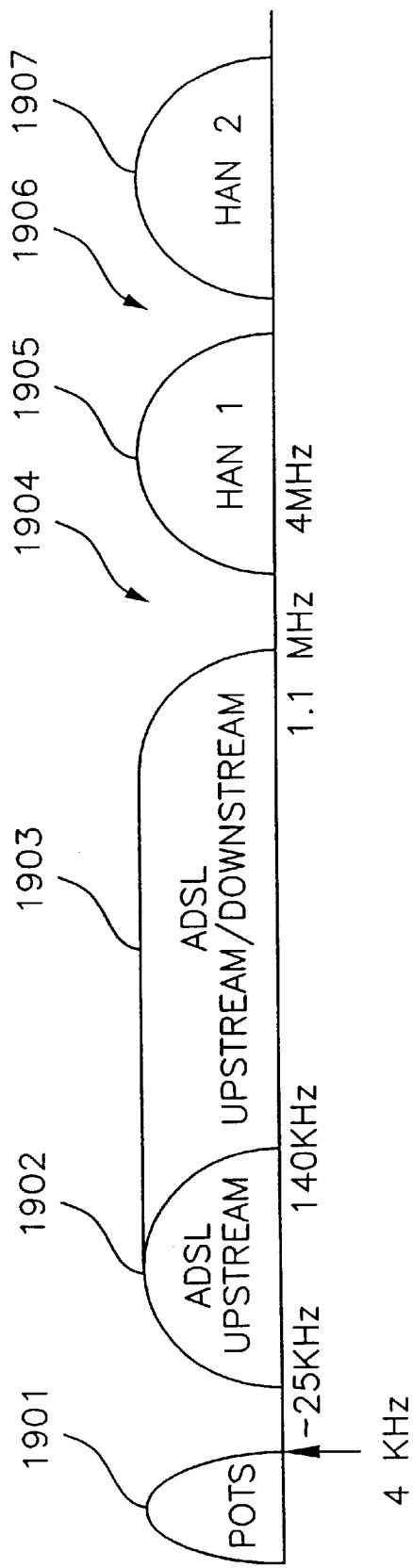
FIG. 19 is an illustration of the spectral allocation of the customer premises wiring shown in FIG. 18.

FIG. 18 shows another embodiment of a virtual gateway system 1800 in accordance with the present invention. Thin embodiment provides two distinct home local area networks (HANs) using installed customer premises wiring and further provides interconnectivity between the district HANs as well as between each HAN and various WANs accessed using the installed customer premises wiring. The system 1800 includes POTS-based WAN 1801, ADSL-accessed WAN 1804, first HAN (HAN1) 1803 and second HAN (HAN2) 1810 interconnected via POTS wiring 1811. FIG. 19 illustrates the spectral allocation (the spectrum 1900) of the POTS wiring 1811. POTS signals 1901 occupy baseband up to approximately 4 KHz. ADSL upstream signals 1902 occupy spectrum from approximately 25 KHz to 1.1 MHz; ADSL downstream signals 1903 occupy from approximately 140 KHz to 1.1 MHz. The spectrum 1900 also includes a dead band 1904 separating HAN1 spectrum 1905 from the ADSL signals 1903. HAN1 spectrum 1905 occupies approximately from 4 MHz to 10 MHz and HAN2 spectrum 1907 occupies from approximately 14 MHz to 20 MHz with HAN1 spectrum 1905 and HAN2 spectrum 1907 being separated by a dead band 1906.

Referring now back to FIG. 18, system 1800 includes a plurality of HAN1 clients 1805, a plurality of HAN2 clients 1806 as well as conventional telephones 1808 coupled to customer premises wiring (POTS wiring) 1811 via passive coupling devices 1807. System 1800 also includes a central virtual gateway 1809.

HAN1 1803 provides communication among HAN1 clients 1805 using information signals confined to the spectral band associated with HAN1 1803 as shown in FIG. 19. Similarly, HAN2 1810 provides communication among HAN2 clients 1806 using information signals confined to the spectral band associated with HAN2 1810 as shown in FIG. 19. Information is transferred between HAN1 1803 and HAN2 1810 using virtual gateway 1809.

Virtual gateway 1809 includes a HAN NIC (as described above in reference to FIG. 5) for each of HAN1 1803 and HAN2 1810. Virtual gateway 1809 additionally includes an ADSL modem card allowing bi-directional communication with HAN2 804 and a POTS modem card for communicating with networks accessed using conventional POTS-compatible modems. Thus, two distinct local area networks (HAN1 1803 and HAN2 1810) coexist on the same wiring infrastructure (customer premises wiring) that also delivers conventional POTS services.

It should be understood that although the above described embodiments have modem cards (e.g., HAN NIC cards, ADSL modem cards and POTS modem cards) that are separate circuit cards, other embodiments of the invention combine one or more of the above described modems in a single modem chip located on a single modem card.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A communications system, comprising:
    a central office for providing bi-directional communication between a first network within a first spectral band and a second network within a second spectral band and one or more customer premises via a subscriber loop, wherein at least one of said customer premises comprises,
    a gateway server coupled to the subscriber loop via a shared electrically contiguous communication channel, the gateway server including:
        a first transceiver for providing bidirectional communication between said first network within said first spectral band and a third network coupled to said shared communication channel within a third spectral band; and
        a second transceiver for providing bidirectional communication between said second network within said second spectral band and the third network within the third spectral band.

2. The system of claim 1 further comprising a first network protocol translator coupled to the first transceiver for translating information from a first protocol associated with the first network to a third protocol associated with the third network and a second network protocol translator coupled to the second transceiver for translating information from a second protocol associated with the second network to the third protocol associated with the third network.

3. The system of claim 1 wherein the shared communication channel is unshielded twisted pair wiring.

4. The system of claim 3 wherein the first device network is a wide area network and access to the second device network is provided by a digital subscriber line (xDSL).

5. The system of claim 4 wherein the xDSL is an asymmetrical digital subscriber line (ADSL).

6. The system of claim 3 wherein the second device network is a public switched telephone network and access to the second device network is provided by POTS.

7. The system of claim 1 further comprising a filter coupled between the subscriber loop and the shared communications channel for removing signals in the third spectral band.

8. The system of claim 7 wherein the filter is a diplexer filter with a matching resistor for reducing signal reflections of the shared communication channels.

9. The system of claim 1 wherein the second spectral band is higher in frequency that the first spectral band and wherein the third spectral band is higher in frequency than the second spectral band.

10. A communications system, comprising:
    a shared communication channel coupled to each of the device networks, the shared communication channel having first and second separate spectral bands associated with the first and second device networks respectively; and
    a gateway server coupled to the shared electrically contiguous communication channel, the gateway server including:
        a first transceiver for providing bidirectional communication between said first network within said first spectral band and a third network coupled to the shared communication channel within a third spectral band; and
        a second transceiver for providing bidirectional communication between said second network within said second spectral band and the third network within the third spectral band.

11. The system of claim 10 further comprising:
a first network protocol translator coupled to the first transceiver for translating information from a first protocol associated with the first network to a third protocol associated with the third network and a second network protocol translator coupled to the second transceiver for translating information from a second protocol associated with the second network to the third protocol associated with the third network.

12. The system of claim 10 wherein the shared communication channel is unshielded twisted pair wiring coupled to a telephone central office by a subscriber loop.

13. The system of claim 12 wherein the first device network is a local area network having a plurality of network clients and access to the second device network is provided by a digital subscriber line (xDSL).

14. The system of claim 13 wherein the xDSL is an asymmetrical digital subscriber line (ADSL).

15. The system of claim 12 wherein both the first transceiver and the second transceiver of the gateway server are located at a single server device.

16. The system of claim 10 wherein the first device network is a local area network having a plurality of network clients and the second device network is an integrated services digital network (ISDN) wide area network.

17. The system of claim 10 wherein the first device network is a local area network having a plurality of network clients and the second device network is a wide area network.

18. The system of claim 10 wherein the first device network is a first local area network and the second device network is a second local area network.

19. The system of claim 12 wherein the first device network is a first local area network and the second device network is a second local area network.

20. A virtual gateway server coupled to a shared electrically contiguous communication channel for providing bi-directional communication between a first device network and a second device network also coupled to the communication channel, the virtual gateway server comprising:
a first transceiver for providing bidirectional communication between said first network within a first spectral band associated with the first device network and a third network coupled to the shared communication channel within a third spectral band; and
a second transceiver for providing bidirectional communication between said second network within a second spectral band associated with the second device network and the third network within the third spectral band.

21. The system of claim 20 further comprising:
a first network protocol translator coupled to the first transceiver for translating information from a first protocol associated with the first network to a third protocol associated with the third network and a second network protocol translator coupled to the second transceiver for translating information from a second protocol associated with the second network to the third protocol associated with the third network.

22. The system of claim 20 wherein the shared communication channel is unshielded twisted pair wiring coupled to a telephone central office by a subscriber loop.

23. The system of claim 22 wherein the first device network is a local area network having a plurality, of network clients and access to the second device network is provided by a digital subscriber line (xDSL).

24. The system of claim 23 wherein the xDSL is an asymmetrical digital subscriber line (ADSL).

25. The system of claim 22 wherein both the first transceiver and the second transceiver of the gateway server are located at a single server device.

26. The system of claim 20 wherein the first device network is a local area network having a plurality of network clients and the second device network is an integrated services digital network (ISDN) wide area network.

27. The system of claim 20 wherein the first device network is a local area network having a plurality of network clients and the second device network is a wide area network.

28. The system of claim 20 wherein the first device network is a first local area network and the second device network is a second local area network.

29. The system of claim 22 wherein the first device network is a first local area network and the second device network is a second local area network.

30. A method of providing communication, comprising:
providing a virtual gateway server coupled to a shared electrically contiguous communication channel;
communicating among first devices in a first device network using communication signals in a first spectral band on the shared communication channel;
communicating among second devices in a second device network using communication signals in a second spectral band distinct from the first spectral band on the shared communication channel; and
communicating among third devices in a third device network using communication signals in a third spectral band distinct from the first and second spectral bands on the shared communication channel;
wherein the virtual gateway server converts information in the first spectral band to the third spectral band to transfer information from the first device network to the third device network; and
wherein the virtual gateway server converts information in the second spectral band to the third spectral band to transfer information from the second device network to the third device network.

31. The method of claim 30 further comprising:
coupling the communication channel to a subscriber loop coupled to a central telephone office.

* * * * *